D. B. WHISTLER AND C. W. RIPSCH.
REGISTERING FARE BOX.
APPLICATION FILED FEB. 27, 1918.
1,355,875.
Patented Oct. 19, 1920.
12 SHEETS—SHEET 8.
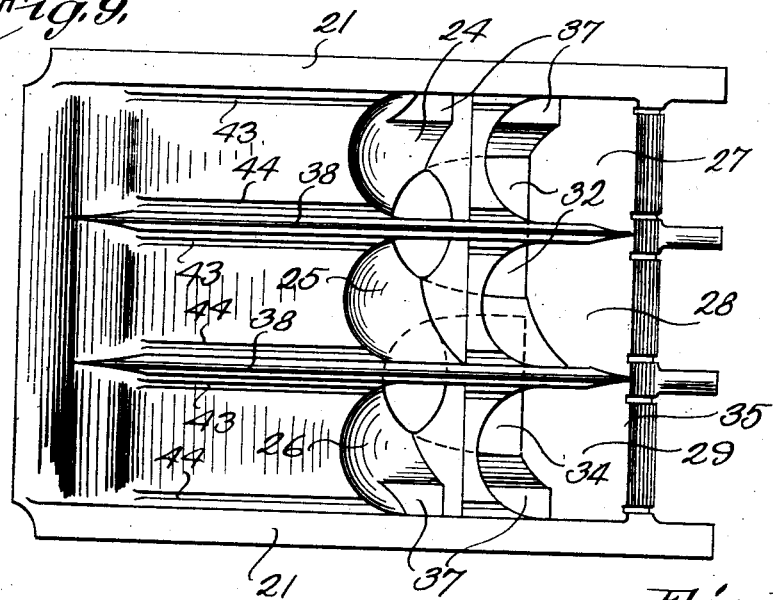
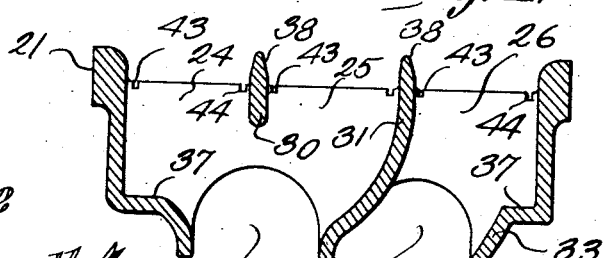
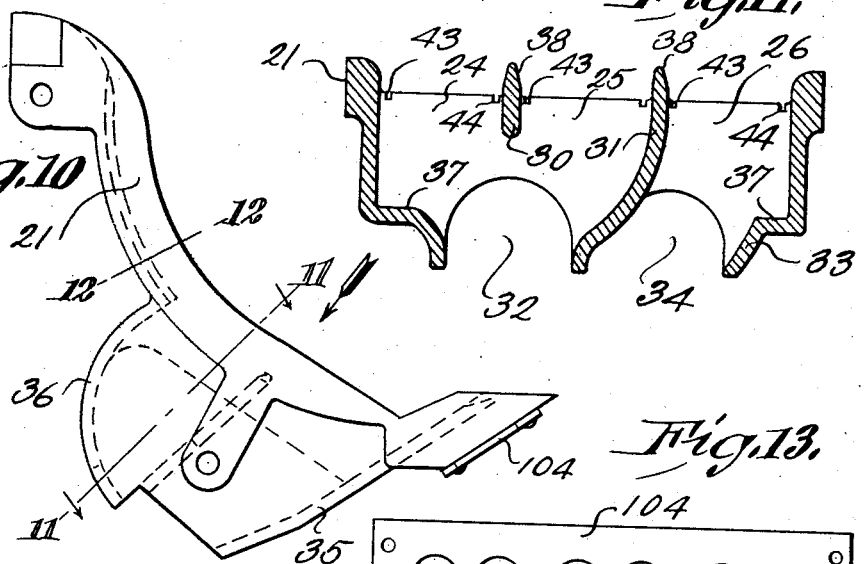
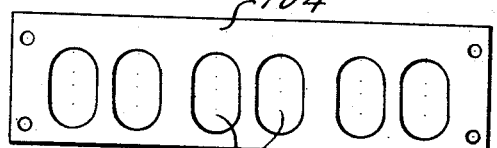
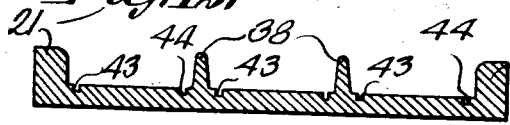
Inventors
David B. Whistler and
Charles W. Ripsch
By Edward Reed
Attorney Inventors
David B. Whistler
Charles W. Ripsch
By Edward Reed
Attorney

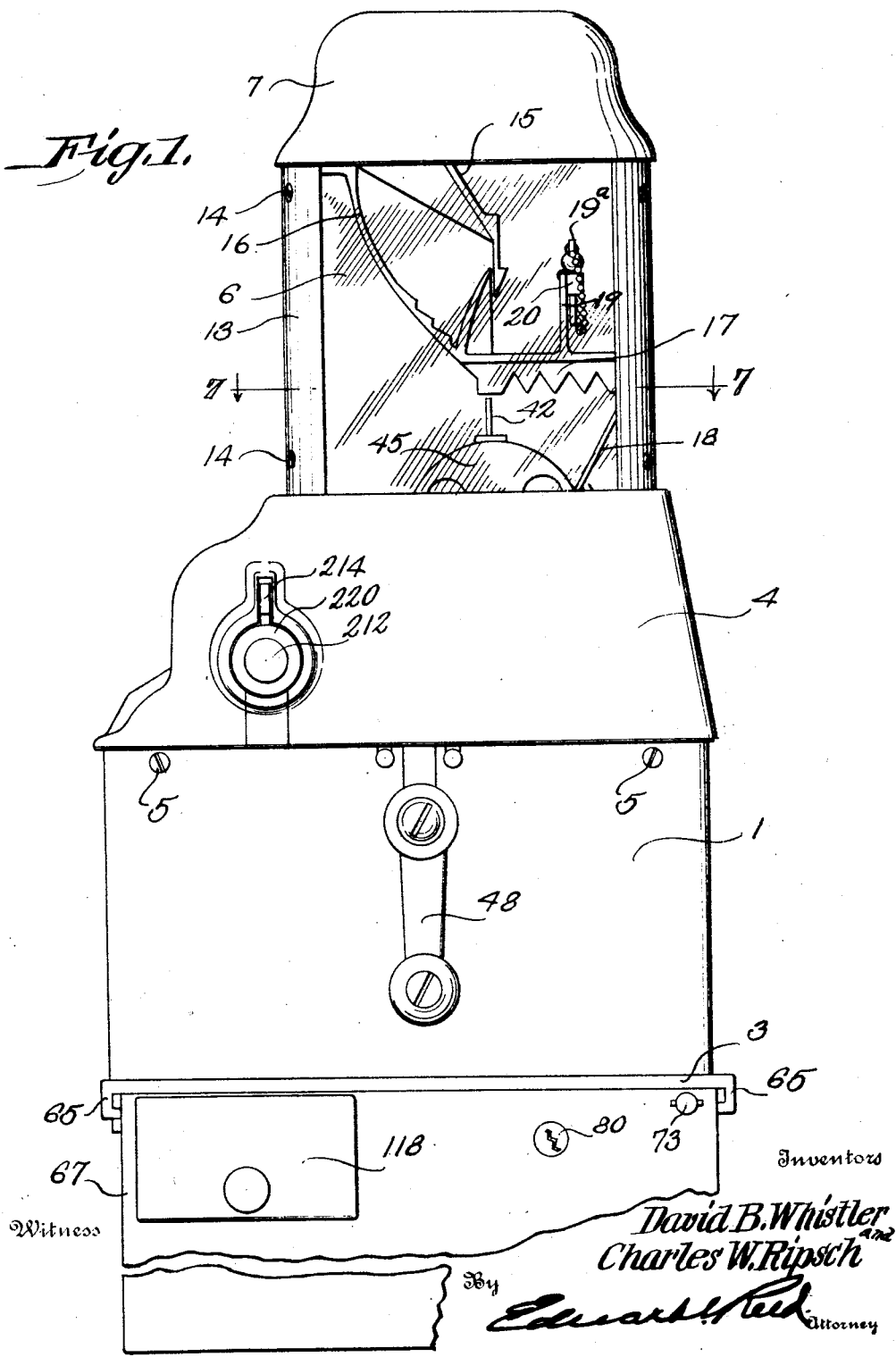

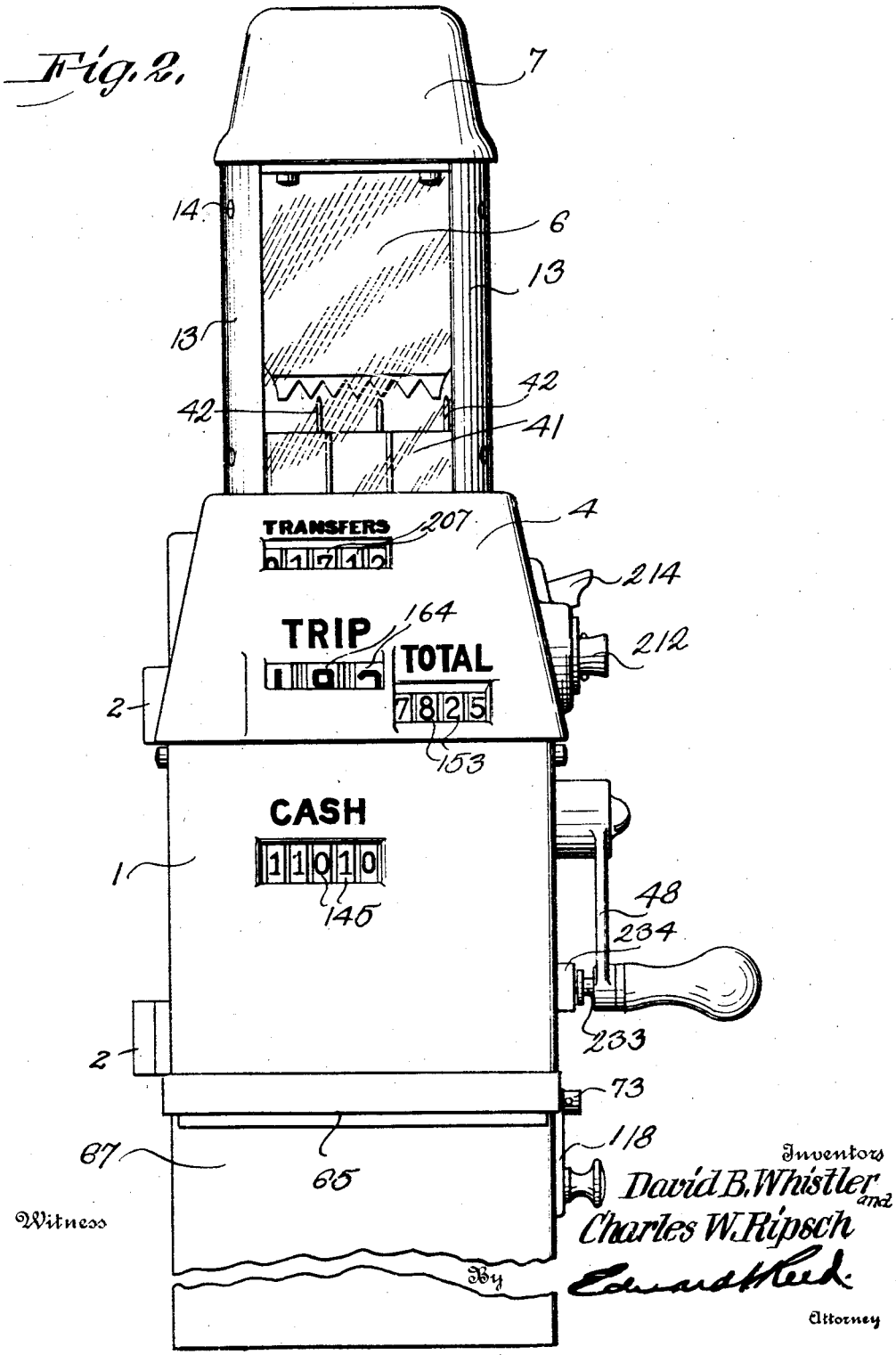

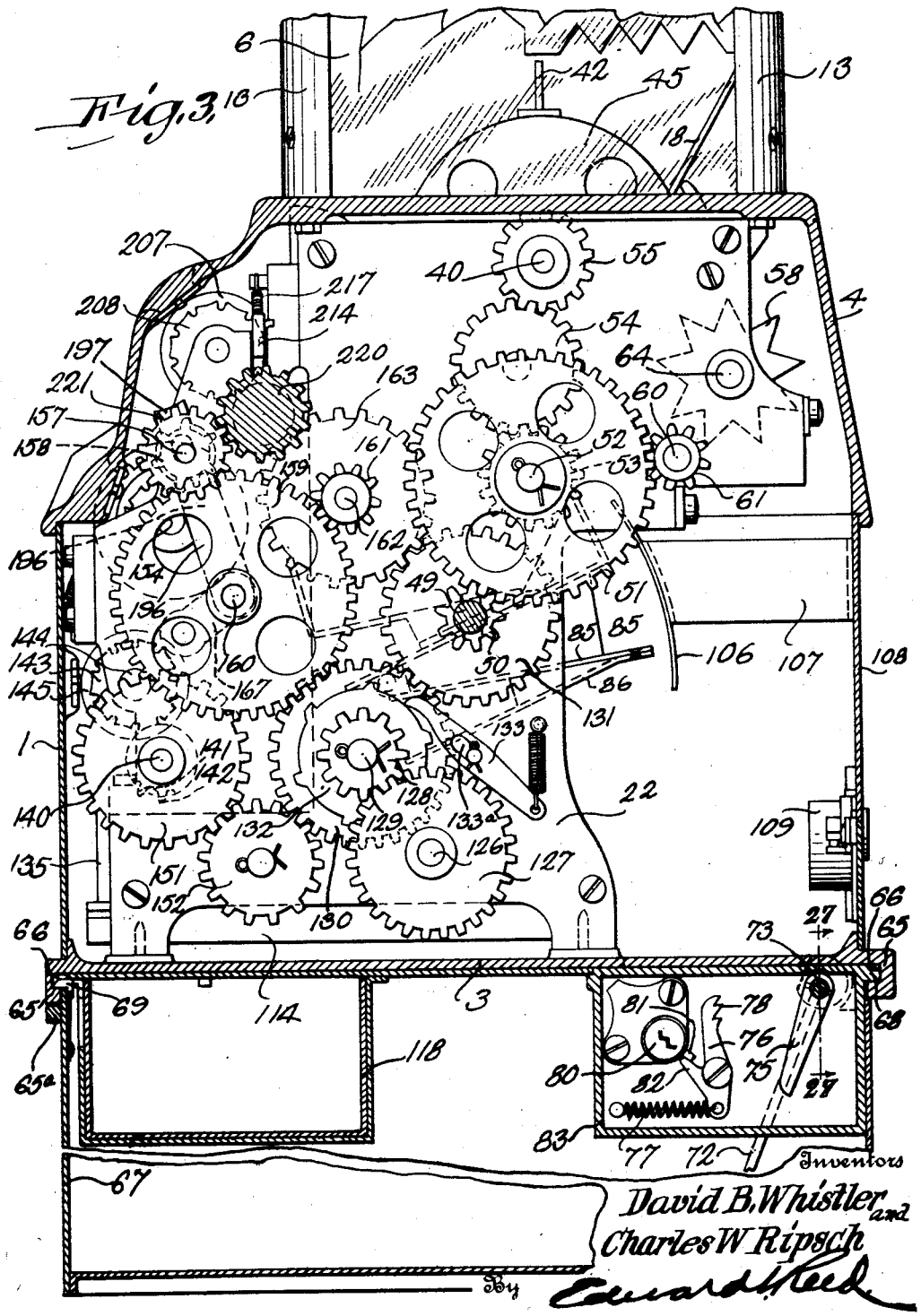

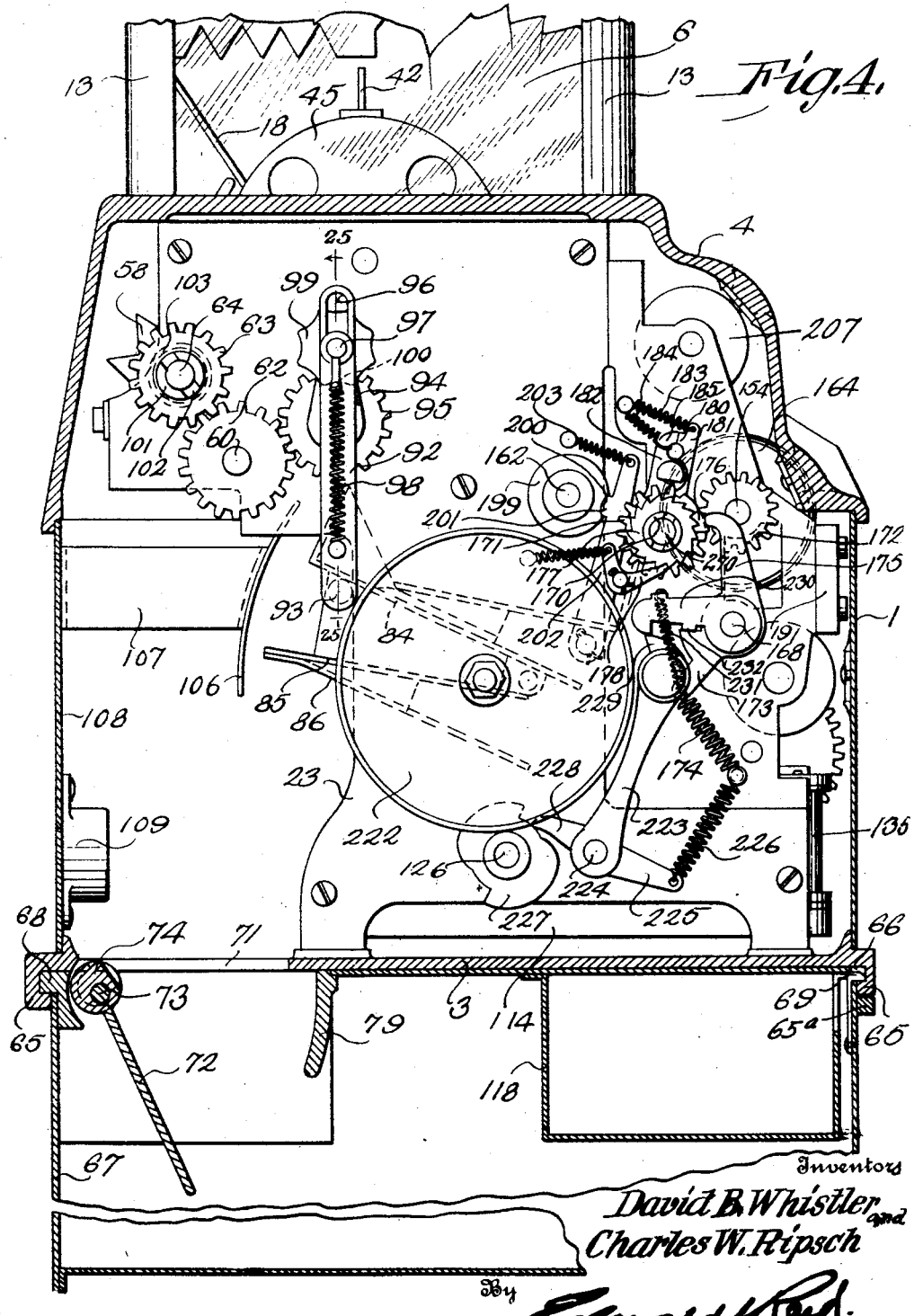

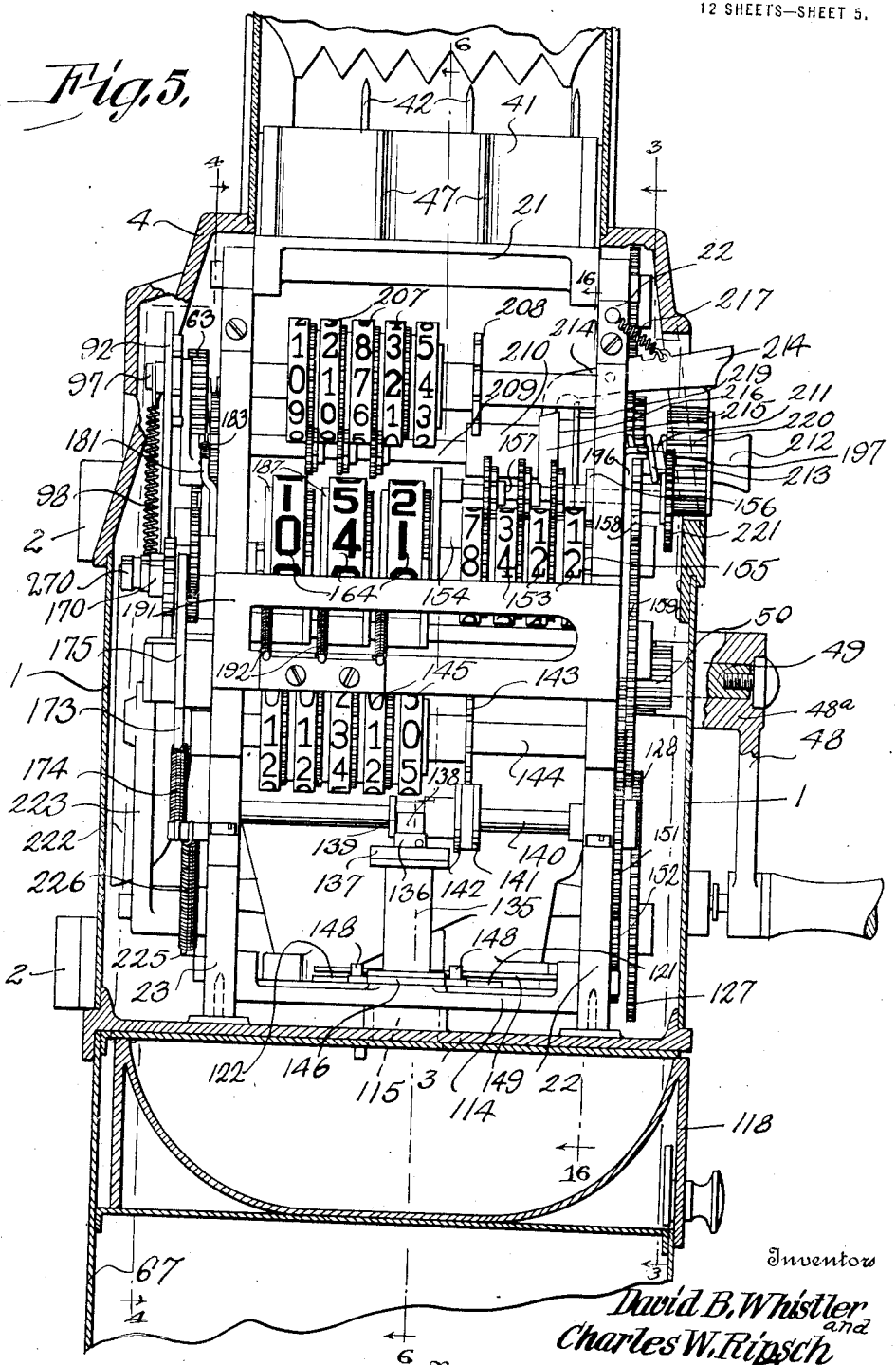

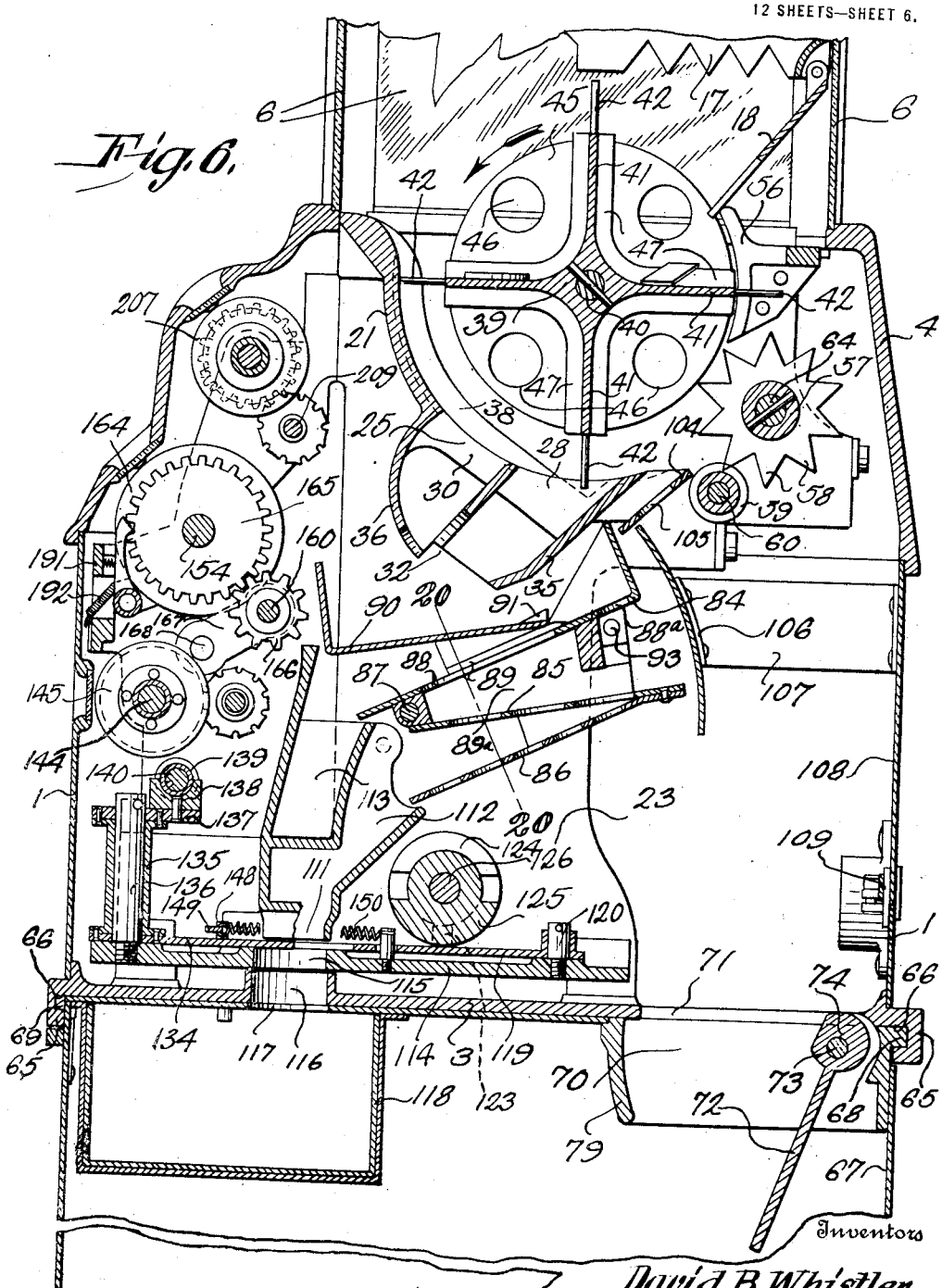

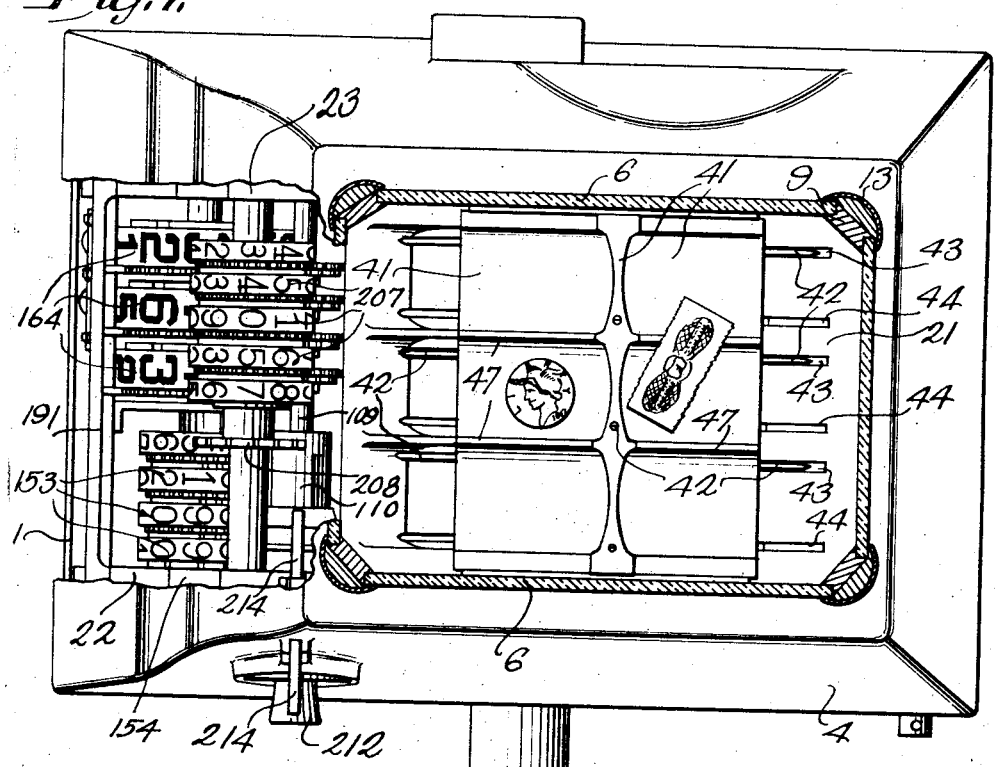
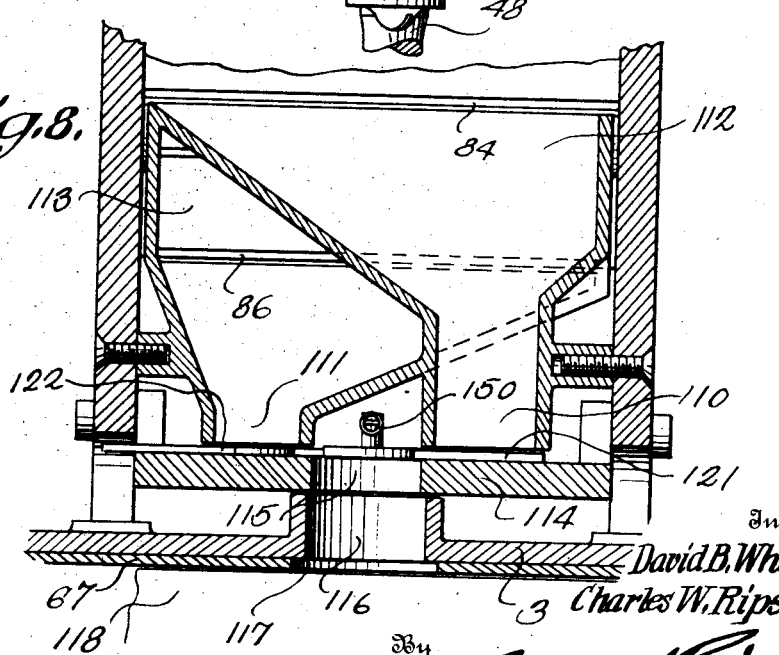

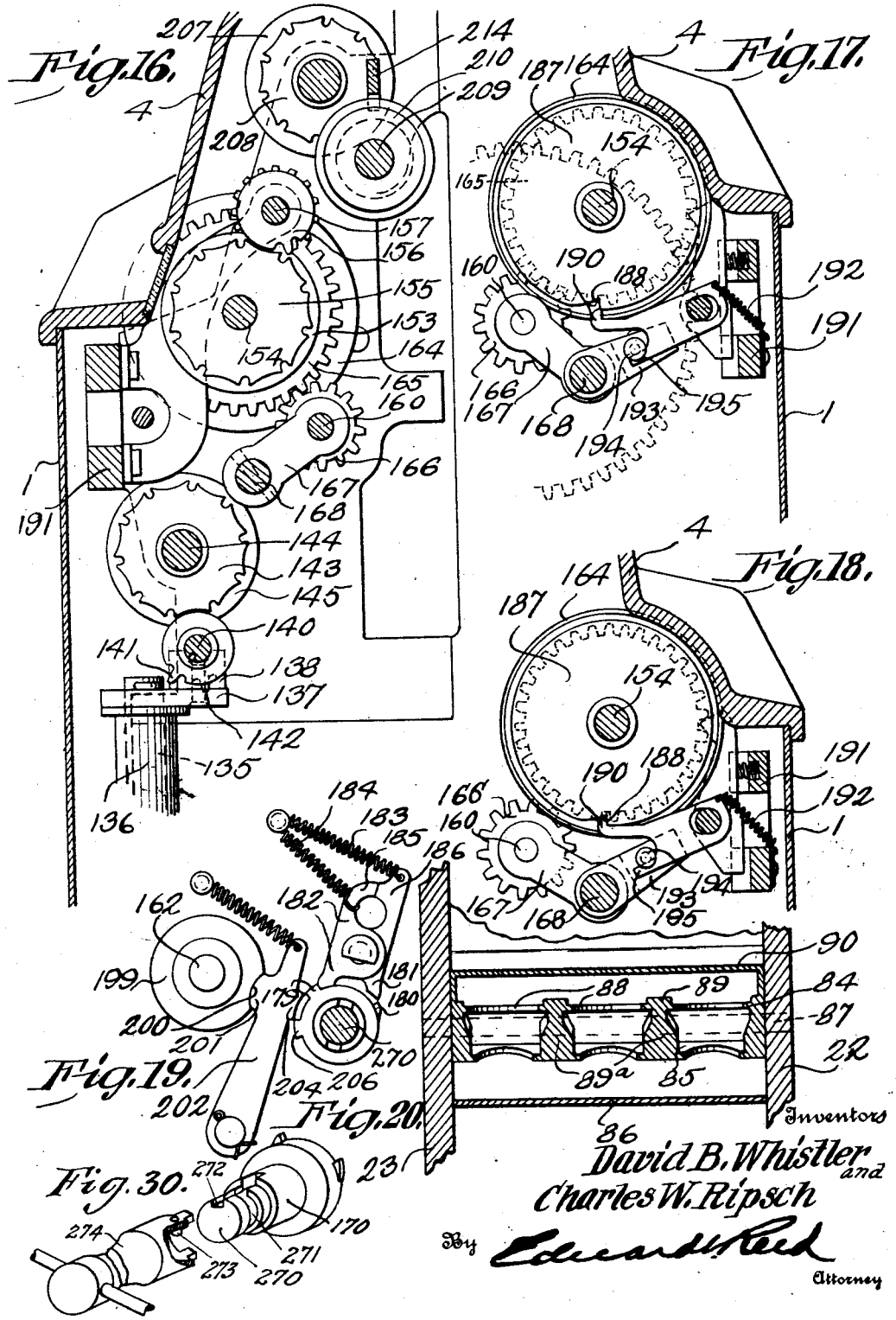

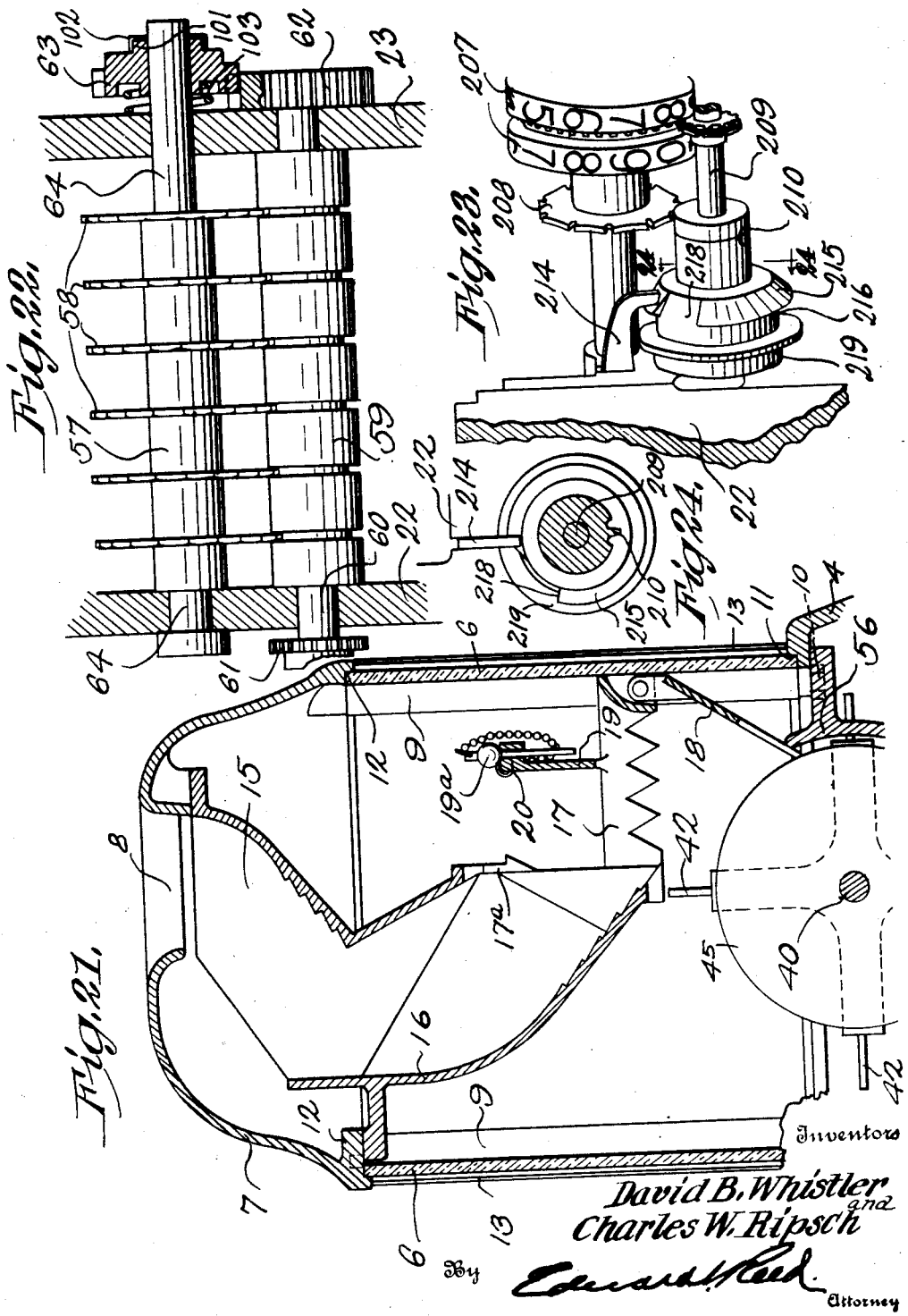

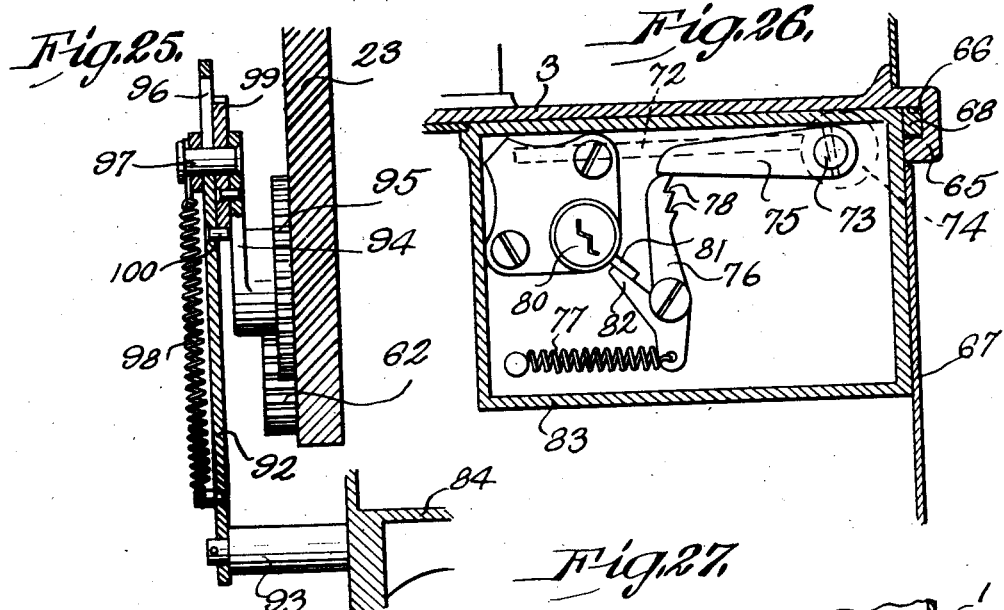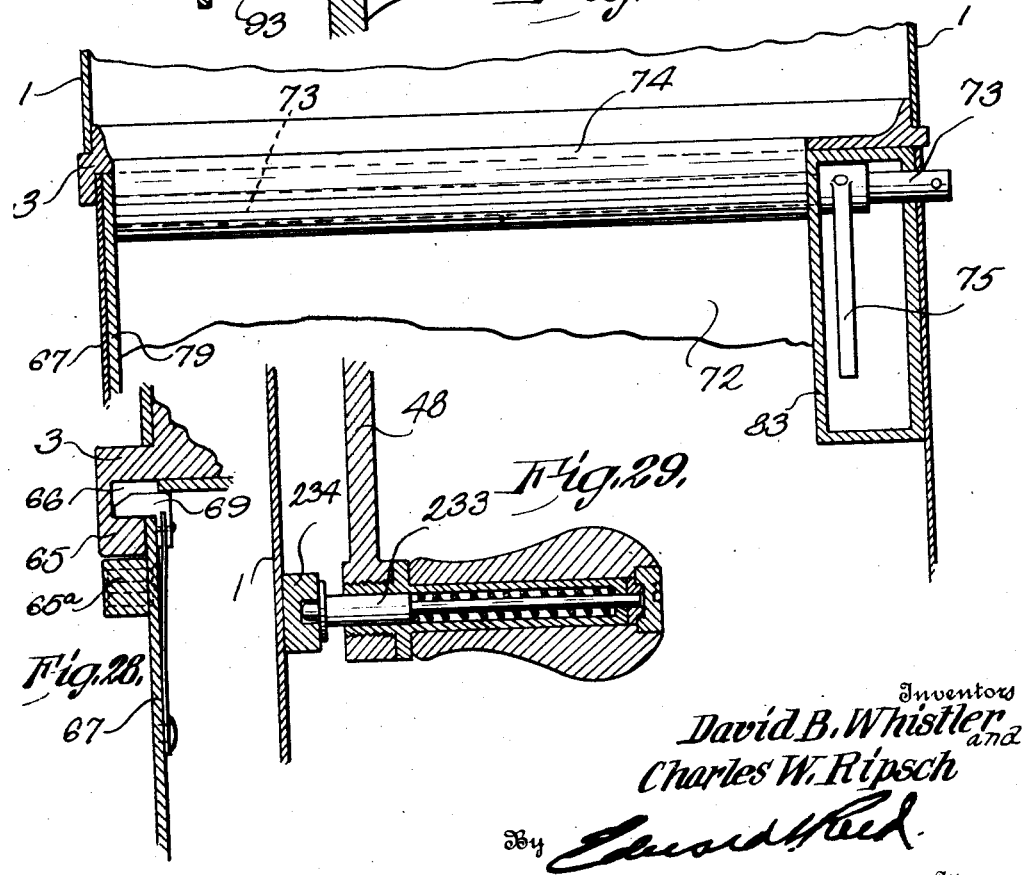

UNITED STATES PATENT OFFICE.

DAVID B. WHISTLER AND CHARLES W. RIPSCH, OF DAYTON, OHIO, ASSIGNORS TO THE AMERICAN RAILWAYS EQUIPMENT CO., OF DAYTON, OHIO, A CORPORATION OF OHIO.

REGISTERING FARE-BOX.

1,355,875.

Specification of Letters Patent. Patented Oct. 19, 1920.

Application filed February 27, 1918. Serial No. 219,413.

*To all whom it may concern:*

Be it known that we, DAVID B. WHISTLER and CHARLES W. RIPSCH, citizens of the United States, residing at Dayton, in the county of Montgomery and State of Ohio, have invented certain new and useful Improvements in Registering Fare-Boxes, of which the following is a specification, reference being had therein to the accompanying drawing.

This invention relates to registering fare boxes, and is in the nature of an improvement upon the fare boxes shown and described in Patent No. 1,234,707, granted to David B. Whistler July 24, 1917, and in the pending application, Serial No. 108,355, filed July 10, 1916, by David B. Whistler.

The object of the invention is to provide a fare box which will receive both coins and paper tickets and will operate with certainty to separate the coins and tickets and to accurately register the value of the coins.

It is also an object of the invention to provide a machine of this kind which will be simple in its construction and operation, which will comprise but a comparatively few parts, and which will have these parts of such a character and so arranged that they will be positive in their operation, and that there will be but little likelihood of their being broken or disarranged in service.

It is also an object of the invention to provide in a machine of this character a separating device for coins and tickets which will also serve to display the fares for examination.

A further object of the invention is to provide means for registering transfers on the machine.

A further object of the invention is to provide a ticket receptacle of such a character that access cannot be had to the interior thereof while it is attached to the machine and that it must be closed and locked before it can be removed from the machine.

Other objects of the invention will appear as the mechanism is described in detail.

Figure 14:
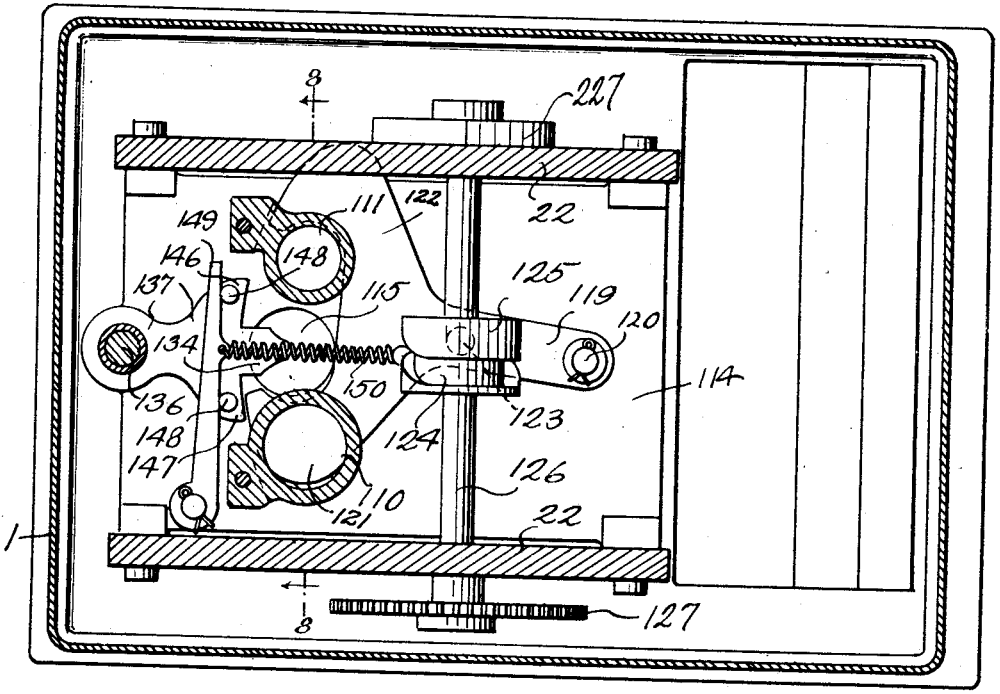
Figure 15:
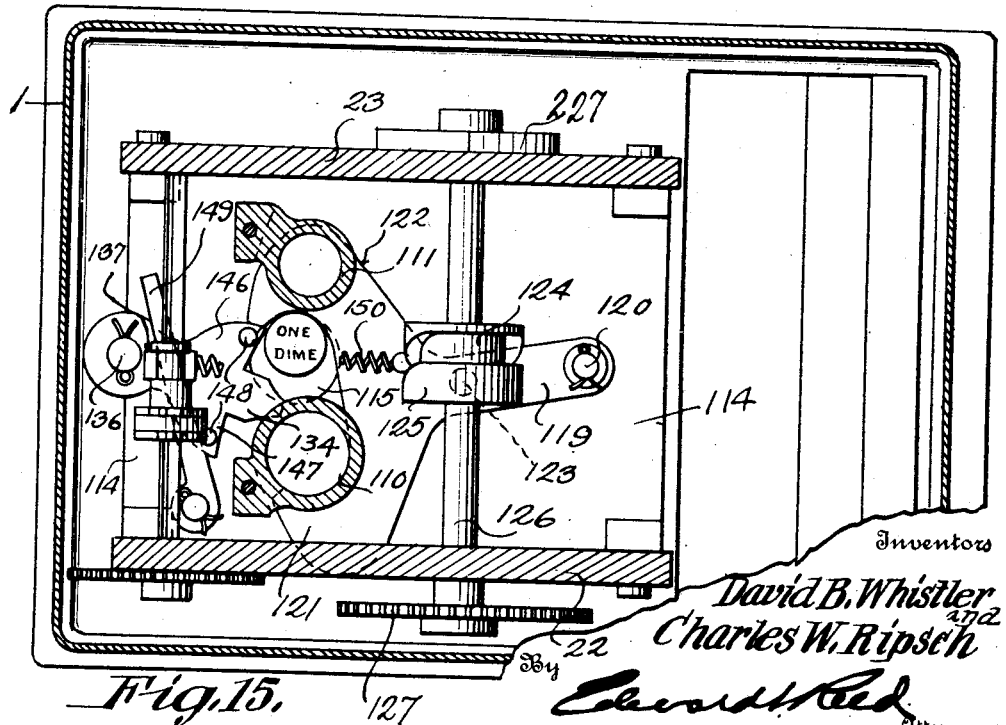

In the accompanying drawings Figure 1 is a side elevation, partly broken away, of a machine embodying our invention; Fig. 2 is a front elevation of the same; Fig. 3 is a section taken just inside the casing on one side of the machine, on the line 3—3 of Fig. 5 and showing the mechanism in side elevation; Fig. 4 is a similar view on the line 4—4 of Fig. 5 taken on the opposite side of the machine; Fig. 5 is a front elevation of the mechanism with the casing broken away; Fig. 6 is a vertical sectional view taken centrally through the machine, and partially broken away at the top and bottom; Fig. 7 is a sectional view taken on the line 7—7 of Fig. 1, looking in the direction of the arrows and showing the casing partly broken away; Fig. 8 is a transverse sectional view taken centrally through the coin stacker; Fig. 9 is a plan view of the fixed member of the coin and ticket separator, looking in the direction of the arrow in Fig. 10; Fig. 10 is a side elevation of the fixed member of the coin and ticket separator; Fig. 11 is a sectional view taken on the line 11—11 of Fig. 9, looking in the direction of the arrows; Fig. 12 is a section taken on the line 12—12 of Fig. 10; Fig. 13 is a detail view of the bottom plate of one of the chutes; Fig. 14 is a plan view of the coin ejecting and register setting devices, showing the ejector at one limit of its movement; Fig. 15 is a similar view showing the ejector at the opposite limit of its movement; Fig. 16 is a sectional view taken just inside of the right hand frame member on the line 16—16 of Fig. 5; Figs. 17 and 18 are detail views of the overthrow detent for the trip counters showing the same in different positions; Fig. 19 is a detail view of the interlocking mechanism between the operating and the resetting mechanisms; Fig. 20 is a sectional view of the coin separator taken on the line 20—20 of Fig. 6; Fig. 21 is a vertical sectional view taken centrally through the examination box; Fig. 22 is an elevation of the canceling devices; Fig. 23 is a detail perspective of the actuators for the transfer counters; Fig. 24 is a section taken on the line 24—24 of Fig. 23; Fig. 25 is a sectional detail view of the vibrator for the coin separator taken on the line 25—25 of Fig. 4; Fig. 26 is a detail view of the locking device for the ticket box, showing the box closed; Fig. 27 is a transverse sectional view taken through the upper part of the ticket box, showing the locking device; Fig. 28 is a detail view of the yieldable lugs forming part of the ticket box; Fig. 29 is a sectional detail view of the operating handle; and Fig. 30 is a perspective view, partly broken away, of the resetting wrench and sleeve.

In these drawings we have illustrated one embodiment of the machine and have shown the same as designed primarily for the collection of fares on a street car, but it will be understood that the machine is not limited in its use to street cars, but that it may be utilized for collecting admission fees or charges of various kinds, where such charges are paid to a collector stationed at a fixed point. In this embodiment of the invention the mechanism is inclosed within a main casing 1 which is provided on one side with attaching devices, such as lugs, 2, by means of which the machine may be secured to a standard, or other supporting device. The casing is provided with a bottom plate 3 upon which the supporting frame for the registering mechanism is mounted, and has its upper portion in the form of a top plate, or casting, 4, which rests upon the upper edges of the walls of the main casing 1 and is secured thereto in any suitable manner, as by means of screws 5. This upper portion, or top plate, forms a support for the tower, or examination box, into which the fares are paid by the passengers. This examination box is provided with sight openings through which the fares deposited therein may be examined by the conductor, or other collector, before they are delivered to the separating mechanism. As here shown the examination box is substantially rectangular in shape and comprises four vertical side walls 6, which are supported between the top casting 4 of the main casing and the top piece, or casting, 7, for the examination box, which top piece is provided with an opening 8 through which the fares may be deposited in the examination box. The several parts of the examination box may be connected one to the other and to the main casing in any suitable manner. In the present construction, however, we have provided the same with four standards, or upright bars, 9, which have screw-threaded portions adapted to be screwed into the respective corners of the top piece 7, and have at their lower ends screw-threaded bolts which pass through openings in the top plate of the main casing and are secured thereto by means of nuts 10. The bars 9 are provided on their edges with longitudinal grooves to receive the adjacent edges of the respective walls 6. These walls fit within the shoulders 11 in the top plate 4 and shoulders 12 in the top 7 of the examination box, and will be retained in position without further fastening devices. However, we prefer to provide additional means to hold the glass walls snugly in position and to prevent their rattling. For this purpose corner pieces, or strips, 13, are placed at each corner of the examination box. These strips are curved about a longitudinal axis so that the edges of each strip will engage the outer surfaces of the respective walls 6 adjacent to the upright bars. The corner strips are secured to the upright bars, preferably by means of screws 14, and as these screws are tightened down the edges of the corner strips are drawn firmly into engagement with the glass walls. However, because of the resiliency of the material from which the corner strips are formed this pressure will be a yielding one to provide a cushioning action on the glass which will permit slight movements thereof under strain and thus prevent the breaking of the glass.

Arranged within the examination box is a chute which receives the fares from the opening 8 in the top of the box and delivers them to a suitable part of the mechanism, which in the present instance is the coin and ticket displaying and separating device. As here shown this chute is carried by the top piece 7 of the examination box and the upper portion, 15, thereof extends from the opening toward the forward side of the box, while the lower portion, 16, extends rearwardly. This lower portion of the chute comprises a curved lower wall which is so arranged with relation to the upper portion of the chute that the tickets contacting therewith will be deflected downwardly and there will be no likelihood of their lodging at the turn in the chute. To this end the plate 16 is of a width greater than the width of the upper portion of the chute and extends to a point well above the turn in the chute. At the point of delivery the chute is provided with inwardly extending guards 17, 17$^a$, 18 and 19 to prevent the fares being removed through the chute and the opening 8. The guard 17 extends inwardly from the side walls of the examination box and prevents the coins from being moved out along the side walls, by tilting the box, and then caused to enter the chutes by a further manipulation of the box as a whole. The guards 17$^a$ and 19 are so arranged that if the box is manipulated to cause fares to lie upon the rear wall of the examination box these guards will prevent the fares being thrown into the chute by a further manipulation of the box. The guard 18 is in the form of a hinged door which, when the box is in an upright position, extends downwardly and inwardly from its axis. If the box is tilted or turned wrong side up in an effort to remove fares from the examination box this guard 18 will be moved across the open lower end of the chute, thus closing the same and effectually preventing the withdrawal of the fares. This guard 18 also has an additional function in connection with the movable member of the separating device, which will be hereinafter described. The examination box is also provided with a tell-tale in the form of a weighted pin 19$^a$ loosely mounted in a socket 20 and which will fall from the socket if the box is inverted, and which cannot be replaced without removing the upper portion of the casing and the examination box from the machine. Consequently any attempt to remove fares by inverting the box will be disclosed.

As has been stated, the fares are, in the present instance, delivered from the chute directly to the display and separating mechanism, and we have, therefore, provided the examination box with an open bottom, by cutting away the upper wall of the top casting 4 of the main casing within the side walls of the examination box, and have so arranged the separating mechanism that it will in effect form the bottom for the examination box. The separating device for the coins and tickets may take various forms, but the best results so far have been obtained with a separating device comprising two parts, one of which is fixed and provided with apertures for the passage of coins, and the other of which is rotatable about a fixed axis to move the tickets over the apertured member and remove them therefrom. In the present machine the separating mechanism comprises a fixed separating member 21 which is curved about a transverse axis and extends downwardly and rearwardly from the lower edge of the forward wall of the examination box and is rigidly secured to the side walls 22 and 23 of the main frame, which carries the various parts of the mechanism and which extends upwardly from the base plate 3 of the casing. This fixed separating member, which may be characterized as a "bowl," is provided with discharge openings, or apertures, through which the coins may pass, but which are of such a character as to prevent the passage of the tickets. In the present instance this separating member is provided with two series of openings extending transversely thereof, each series comprising three openings which are indicated at 24, 25 and 26, in the first series, and at 27, 28 and 29 in the second series. These openings are each of such a size as to permit the passage of the largest size of coin which the machine is designed to handle, which in the present machine is a 5-cent piece, or nickel, the machine being designed to handle pennies, nickels and dimes. However, it is preferable that the openings be of such a size as to permit the passage of quarters, should such coin be inadvertently dropped into the box; and in the present instance the openings will pass the quarters and these may be removed from the mechanism as will be hereinafter described. The openings are so arranged that the tickets will not pass through them but will be carried across the openings and removed from the fixed separating member by the movable separating member. To more effectually prevent the passage of tickets through the discharge openings these openings are preferably provided with downwardly extending channels, or chutes, having offset portions, or lateral turns, which, while not affecting the passage of the coins, will prevent the passage of the tickets, because these latter cannot be bent edgewise to enable them to make the turn. As here shown the openings are separated by longitudinal partitions, 30 and 31, and the openings 24 and 27 are formed between the partitions 30, and the outer wall of the separating member, and the openings 25 and 28 are formed between the partitions 30 and 31, while the openings 26 and 29 are formed between the partition 31 and the other outer wall of the separating member. To provide the openings with the desired offset, or turn, without increasing the width of the separating member, we have caused the openings 24 and 25 and the openings 27 and 28 to merge into a single discharge opening 32, this being accomplished by causing the side wall of the separating member and the partition 31 to converge inwardly and downwardly, and extending this wall and partition some distance below the surface of the separating member. The partition 30 is of such a depth that it will divide the upper part only of the space between the outer wall and the partition 31 into separate channels leading from the openings 24 and 25 and from the openings 27 and 28 to the opening 32. The other outer wall of the separating member, that is the one adjacent to the partition 31, extends inwardly and downwardly along a line substantially parallel with the partition 31, as shown at 33, thus imparting a curvature, or offset, to the channels leading from the openings 26 and 29 to an opening 34. The rear walls of the channels leading from the second series of openings 27, 28 and 29 extend forwardly, as shown at 35 in Fig. 10, and constitute forwardly extending guards which deflect the fares toward the respective openings 32 and 34. The front walls of the channels leading from the openings 24, 25 and 26 are formed by a downwardly curved wall, or flange, 36, which is shaped to deflect the fares toward the openings 32 and 34. The channels leading from the outer openings 24 and 27, and 26 and 29, to the respective openings 32 and 34 are also provided with shoulders, or ledges, 37, which will engage the lower edge of any ticket that may enter any one of these openings and will support the ticket in a position to be engaged by the movable separating member which will withdraw it from the opening and remove it from the fixed separating member. The surface of the fixed separating member is provided with longitudinally extending ribs 38 which extend along the upper edges of the partitions 30 and 31 and serve to support the tickets above and out of engagement with the surface of the separating member. This not only facilitates the movement of the tickets and holds them in a position where they may be readily engaged by the movable separating member, but it provides a space between the tickets and the surface of the fixed member to provide for the passage of the coins, which can thus move readily to the discharge openings by gravity.

The movable separating member is mounted for rotation about a fixed axis and is provided with projections, or fingers, which are of such a length that they will travel along the surface of the fixed separating member and engage the tickets and remove them from said fixed member, and if any coin should have hung upon the fixed separating member it will also be engaged by these fingers and caused to pass through the discharge openings. In the construction here shown this movable separating member has the additional functions of displaying the fares and conveying the same to the fixed separating member, and comprises a hub 39 pinned to a shaft 40, which is journaled in the side walls 22 and 23 of the main frame, and this hub is provided with a plurality of radially extending webs, or walls, 41, which are of a length somewhat less than the distance between the axis of the hub 39 and the supporting surface of the fixed separating member. These webs are adapted to receive the fares as they are deposited in the examination box and to support them while they are being inspected. Projecting from the edge of each web, or wall, 41, is a series of projections, or fingers, 42, which as here shown are in the form of pins extending radially therefrom, and of such a length that they will engage any ticket or fare which may be supported on the surface of the fixed separating member. To insure a proper engagement of the fares by the fingers 42 we prefer to provide the fixed separating member with grooves 43 and 44, into which the ends of the fingers extend. Thus, if a ticket rests flat upon the supporting surface the fingers can engage the rear edge thereof, or if they engage the upper surface of the ticket they can pierce the same and thus carry it along. The pins, or fingers, 42 are so arranged that they will not prevent the movement of coins past the same, but are at the same time so arranged that they will engage any fare which may rest upon the supporting surface of the fixed separating member. To accomplish this the fingers of each web 41 are so arranged that there will be space enough between each finger and one of the ribs, or walls, of the separating member to permit the passage of coins, but the fingers on the successive webs are arranged in different positions so as to produce a staggered effect and to travel in different paths. In the present construction the fixed member of the separator is provided with six grooves and it will be noted, see Figs. 9 and 11, that the grooves 43 lie on the same side of the several ribs, while the grooves 44 are on the opposite sides of those ribs. The fingers 42 of one web of the movable separating member are so arranged that they will enter the grooves 43, while the fingers on the following web are so arranged that they will enter the grooves 44. The spaces between the respective grooves 44 and 43 are not sufficient to support either a coin or ticket and consequently any coin which may rest upon the surface of the separating member will extend across one of the grooves and will be engaged by a finger of one series or the other, yet there is always sufficient space between the fingers and the ribs to permit a coin to move past the fingers. The spaces between the successive webs, at the ends of the movable separating member, are preferably closed by means of disks 45, to prevent the fares from escaping about the ends of these webs, and from projecting beyond the ends of the webs so as to catch upon the edges of the walls or any other part of the structure which may form a shoulder, or projection, and the disks may, if desired, be provided with openings 46 which not only admit light to facilitate the examination of the fares, but also reduce the weight of the structure. The webs are also preferably provided with transverse ribs 47 which serve the same purpose as do the ribs 38 on the fixed separating member, that is, they prevent the tickets from lying flat upon the surface of the webs and permit the coins to slip readily off the webs from beneath the tickets. The movable separating member may be actuated in any suitable manner, but we prefer to advance the same one-fourth of a revolution upon each operation of the machine and to so regulate these movements that one pair of webs will always be in a horizontal position when the operating mechanism of the machine is in its normal position. Thus there is always a web in position to receive the fares and to display the same for examination through the walls of the examination box. In the present machine the mechanism is operated and the fares registered manually, although it will be obvious that operating mechanism of other kinds could be substituted for the manually operated mechanism without other change in the mechanism as a whole. As here shown the operating device comprises a handle, or crank, 48, which is rigidly secured to a sleeve 48a which is journaled on a stud shaft 49 mounted in the frame member 22. The sleeve 48a has rigidly secured thereto, preferably by means of a clutch, a pinion 50 which meshes with a gear 51 journaled on the end of a shaft 52 and having rigidly secured thereto a pinion 53 which in turn meshes with an idle gear 54 which meshes with a pinion 55 on the shaft 40 of the movable separator. These gears are of such ratio that one complete rotation of the operating handle will cause the shaft 52 to make one-fourth of a rotation. It will be noted that as the fares are discharged from the chute of the examination box they will be delivered onto one of the horizontal webs 41 of the movable separating members, either striking this web directly or striking the guard plate 18 and being deflected onto the web. A slotted guard member 56 is curved about the periphery of the rotatable separating member and extends above the horizontal position of the web 41 upon which the fares are delivered, and preferably extends into engagement with the guard member 18, which in the present instance rests upon the guard member 56, the guard member 18 having its lower end slotted to permit the passage of the fingers 42. Consequently the fares delivered to the web 41 of the separating member are prevented from escaping therefrom, and are supported in such positions that they can be readily examined. Further, the hinged guard 18 and the fixed guard 56 serve to prevent the passage of fares about the rear edge of the web of the movable separating member should the fares be delivered thereon when the movable separating member is out of its normal position, that is, when the web is not in its horizontal position. This is accomplished by causing the end of the hinged guard to project into the path of the ends of the webs 41 so that as the movable separating member rotates with the end of the guard will be carried with the upwardly moving web until the succeeding web has passed the lower edge of the guard 56, which projects some distance below the normal position of the web. Consequently the space in the rear of the movable separating member is always closed, either by the coöperation of the web 41 and the hinged guard 18, or by the coöperation of the web 41 and the fixed guard 56. As soon as the fare has been examined the conductor, or collector, operates the handle 48 to register the fare, as will be hereinafter explained, and by the same movement advances the movable separating member one step, or one-fourth of a revolution. This results in the fares being moved onto the upper side of the preceding web, which has now moved into a horizontal position, and which serves to support the fares for further examination. Inasmuch as the fares are usually turned over in moving from one web to the other this operation not only affords two opportunities to inspect the fares but enables both sides of the fares to be examined, should this be desirable. The fares remain in this position until another fare has been received and registered, when the further movement of the movable separating member will cause the fares to be delivered to the fixed separating member where they will be acted upon by the further movement of the movable separating member to cause the coins to pass through the discharge openings, if they have not passed therethrough by gravity, and to remove the tickets from said fixed separating member.

The tickets which are removed from the fixed separating member are delivered to a locked box where they are inaccessible to the conductor, or other collector, and they may or may not be canceled before delivering them to this box. In the present machine, however, we have provided means for canceling the tickets so they cannot be again used. As here shown the ticket canceling devices comprise two coöperating rollers, one of which, the roller 57, is provided with a plurality of series of teeth 58, which are adapted to enter circumferential grooves formed in the other roller 59. These two rollers are so arranged that the tickets, as they are discharged from the separating device, will be delivered directly to the canceling rollers and will be caused to pass between these rollers, which thus form a series of perforations in the tickets. The canceling rollers may be operated in any suitable manner, but in the present instance, the roller 59 is mounted on a shaft 60 journaled in the frame members 22 and 23 and having on one end thereof a gear 61 meshing with the gear 51 of the driving mechanism. The opposite end of the shaft 60 has secured thereto a gear 62 which meshes with a gear 63 rigidly secured to a shaft 64 on which the toothed roller 57 is mounted, thus both rollers are positively driven and are caused to rotate in opposite directions. The tickets may be delivered to any suitable receptacle, which is preferably so arranged that the tickets will drop into the same by gravity and which is locked so that access can be had thereto only by properly authorized persons. It is desirable that this ticket box should be of such a character that it can be placed upon and removed from the machine by the conductor, but it is not desirable that the conductor should have access to the box after tickets have been delivered thereto. We have, therefore, so constructed the box and its supporting devices that it can be placed upon the machine in an open condition by the conductor, but after it has been placed in position it cannot be removed until it has been closed and locked, and as the conductor is not provided with a key to the box he can have no access thereto after it has been removed. The ticket box may be mounted in any suitable position upon the machine, but in order to secure a box of large capacity without increasing the size of the machine in objectionable directions, we have in the present instance mounted the box beneath the main casing 1, and have formed the same of such a size and shape as to form an extension of the casing. As here shown the bottom plate of the casing 1 is provided with depending flanges 65 in which are formed guide-ways 66 extending transversely to the machine. The ticket box which is indicated by the reference numeral 67, has at one edge an outwardly extending flange, or projection, 68, adapted to enter the guide-way 66 at one side of the machine, and the ticket box is provided at its opposite edge with a series of catches, or yieldable lugs 69 adapted to enter the guide-way 66 at the opposite edge of the bottom plate 3. (Fig. 28.) These yieldable lugs are of such a character that when the ticket box is tilted and the flange 68 inserted in its guide-way 66 and that edge of the box carrying the lugs 69 moved upwardly the lugs will yield to pass the lower edge of their guide-way and will then spring into the guide-way, firmly locking the box against removal. There are no means provided for retracting the lugs after they have entered the guide-way and hence the box cannot be unlocked at this edge and the only way to remove it from the machine is to slide the flange and lugs along the guide-ways so as to remove the box laterally from the machine. A bar, or strip, 65ª, secured to the side wall of the ticket box just below the position of the flange 65 on that side of the box adjacent to the yieldable lugs serves to prevent the lugs being retracted by the insertion of a device of any kind between the flange and the wall of the box. Means are provided, however, for preventing the box from being moved laterally except when it has been closed and locked. This locking means may take various forms, but it is preferably controlled by the movement of the closure for the ticket box. As here shown the ticket box has a receiving opening 70 in the rear of the top wall thereof, which opening is adapted to register with an opening 71 in the bottom plate 3 of the main casing 1, the space within the casing above the opening 71 being unobstructed to permit the tickets to drop from the canceling rollers through the openings 71 and 70 into the ticket box. A closure, or door, 72, is provided for closing the opening 70 in the ticket box, and as here shown this closure is pivotally mounted on a shaft 73 at the rear edge of the opening, and when in its open position will hang down along the rear wall of the ticket box. Rigidly secured to the shaft 73 is an eccentric collar or sleeve, 74, which in the present instance is of a length substantially equal to the width of the openings 70 and 71, but so long as the collar is rigidly secured to the shaft 73 it is not necessary that it should be of this length. One end of the collar is mounted close to that edge of the opening 71 toward which the ticket box must move as it is slipped out of the guide-ways 66. The shape and arrangement of the eccentric collar is such that when the door 72 is in its closed position the edge of the collar will lie beneath the edge of the opening 71 in the bottom plate of the main casing, but when the door is in its open position the collar will project above the edge of the opening so that this edge will lie in the path of the collar and effectually prevent any movement of the ticket box in a direction to slide the same out of the guide-ways 66. Consequently before the ticket box can be removed the door must be closed, and we have provided means for automatically locking the door in its closed position when it has been moved to this position. Various devices may be employed for this purpose, but in the form here shown we have secured to the shaft 73 an arm 75 (Figs. 3 and 26) which moves with the door 72 and is, in the present instance, arranged substantially parallel therewith. Supported within the ticket box is a yieldable latch, or dog, 76, the edge of which will be engaged by the arm 75 as the door 72 is moved to its closed position, and the catch moved forwardly until the arm has passed the same, when it will spring rearwardly into the path of the arm 75 and will prevent the return movement of the arm and consequently will prevent the opening of the door. As here shown the catch is in the form of a lever pivotally mounted between its ends and acted upon by a spring 77 to hold it normally in its locking position. It is preferably provided with a series of teeth 78 arranged to engage the end of the arm 75 and lock the door against return movement when it has been partly, but not completely, closed. Inasmuch as the opening in the ticket box is surrounded by a depending flange 79 it will be apparent that this partial closure of the door will be sufficient to prevent access being had to the interior of the box. Key controlled means are provided for releasing the door to permit it to be opened, and as here shown a key barrel 80 is mounted in the side wall of the ticket box and is provided with a finger 81 adapted to engage a projection, or lip, 82, on the latch 76 and rock the latter about its axis against the tension of the spring when the key barrel is rotated, thus moving the latch out of the path of the arm 75 and permitting the door to be opened. With the ticket box controlled in this manner it will be apparent that when a conductor starts on his run he may be supplied with an empty ticket box which he will place in position on the fare box with the door open, and that the placing of the ticket box in position will lock it against removal until the door is closed. At the end of the day's run when the conductor, or some authorized person, wishes to remove the ticket box he must first close the door 72 and this is preferably accomplished by applying to the end of the shaft 73 a suitable implement for rotating the same, such for example as the socket wrench which is used in resetting the trip register, which will be hereinafter described. When the door has once been closed the box is removed and taken to the office where it is unlocked and its contents removed. Preferably the locking mechanism in the ticket box is inclosed in a casing 83 to prevent the tickets interfering with the proper operation thereof and to prevent any tampering with the locking mechanism when the door is open.

After the coins have been separated from the tickets by passing through the fixed member of the separating device they are registered according to their values, this registration being controlled by the coins themselves, and are then delivered to a cash drawer where they are accessible to the conductor for the purpose of making change, the conductor being held accountable for the amount registered. In the present machine the coins are delivered from the coin and ticket separating device to a coin separating device which separates the coins according to their denominations and delivers the nickels and dimes to the registering mechanism and delivers the pennies to a suitable locked receptacle, the pennies being, in the present instance, delivered to the ticket box along with the tickets. The non-registration of the pennies is desirable because where the pennies are registered an opportunity for fraud is offered to the conductor. It has been found that in registering fare boxes in which pennies were registered the conductors would reduce the diameter of a nickel, or flatten out a dime to increase its diameter so that they would register as pennies, and by then giving these coins to passengers, in making change, would have them deposited in the fare box as 5-cent and 10-cent fares, but because of their modified size they would register as pennies. Consequently there would be a discrepancy in favor of the conductor between the amount of cash registered and the amount actually received. The coin separating device, as here shown comprises a series of superimposed plates through which the coins move by gravity. The upper plate 84 receives all the coins which pass through the coin and ticket separating device and is provided with openings of such size that they will permit the passage of pennies and dimes, but will prevent the passage of nickels. Below the plate 84 is a second plate 85 which is provided with openings of such a size that they will permit the passage of dimes but will prevent the passage of pennies. The lower plate 86 which receives the dimes is apertured only to permit the passage of foreign matter, such as bits of torn paper from tickets. The plates 84 and 86 are inclined toward the front of the machine and are arranged to deliver the coins to suitable stacking tubes, which coöperate with the registering mechanism. The intermediate plate, or penny plate, 85, is inclined rearwardly and will discharge the pennies to the ticket box. The several plates are rigidly connected one to the other to form a unitary structure and this structure is pivotally mounted near its forward edge on a shaft 87, mounted in the frame members 22 and 23, and is adapted to have oscillating, or swinging, movement about the axis of the shaft, to agitate the coins and cause them to work their way along the plates and through the respective openings, or off the discharge ends of the plates. The plates are of such a width that they will fit snugly between the side members 22 and 23 of the frame allowing just enough clearance for the free movement of the separating structure, but not enough to permit the entrance of even a very thin coin. In the present construction of the separator the upper plate 84 which retains the nickels is provided with elongated openings, or slots, 88, of a width slightly less than the diameter of a nickel, and these openings are separated by ribs 89 which are spaced one from the other distances slightly greater than the diameter of a nickel, the arrangement of the ribs being such that there will be a narrow ledge between each side of each opening and the adjacent rib, thus the nickels will move down the channels formed between the ribs and the side walls and pass over the openings, but the pennies and dimes will fall through the openings. The elongated openings make the passage of the smaller coins more certain because there is no possibility of their being caused to jump over the openings by the vibration imparted to the separating member. Obviously the coins must be delivered to the upper end of the separator plate 84 and in the present instance the arrangement of the fixed member of the coin and ticket separating device is such that we have found it desirable to provide a plate 90 which is supported above the plate 84 in a position to receive the coins from the coin and ticket separator and to deliver them to the upper end of the separator plate 84. The plate 90 may, if desired, be provided with lugs, or short ribs, 91, at the discharge end thereof to guide the coins into positions in line with the several openings, thus facilitating the movement of the coins through the separator.

The space between the upper separating plate 84 and the separator plate 85 is divided into channels, or compartments, by ribs, or partitions, 89a, which constitute in effect continuations of the ribs 89 on the plate 84, and the openings in the plate 85 are arranged along these channels. The innermost opening in each channel in the plate 85 is so arranged with relation to the opening in the plate 84 that a coin passing through the upper part of the opening in the plate 84 will pass directly through the plate 85 and will be discharged from the separator. The ribs 89a are spaced apart distances sufficient to permit the passage of coins slightly larger than pennies, consequently if a nickel should be undersized and pass through the openings 88 in the upper separator plate it will move rearwardly along the channel into which it falls and be discharged along with the pennies into the ticket box. Preferably the upper plate 84 is provided along its rear edge with a series of openings 88a to permit the passage of foreign matter such as bits of paper, thus allowing this foreign matter to drop through the several plates and into the ticket box, and preventing it from reaching the registering mechanism. Oscillatory movement may be imparted to the coin and ticket separator in any suitable manner, but in the present construction we have connected the same with the operating mechanism so that movement will be imparted thereto upon each operation of the machine to register a fare. In the construction shown a pitman 92 is pivotally connected with the coin separator near its rear end, as shown at 93 in Figs. 4 and 25, and is connected at its upper end with a crank arm 94 which is pivotally mounted on the adjacent frame member, 23, and has secured thereto a gear 95 which meshes with the gear 62 of the lower canceling roller, which as has been explained is operatively connected with the operating handle for the machine. While this oscillatory movement will in itself serve to cause the coins to move through the separator, the movement is sometimes more or less sluggish and it has been found preferable to impart further vibratory movement to the separator to accelerate the movement of the coins. To accomplish this the outer end of the pitman 92 is slotted, as shown at 96, to permit it to have movement relatively to the wrist pin 97 of the crank arm 94. A spring 98 is connected with the wrist pin and with the pitman 92 to hold the latter normally with the lower end of the slot in engagement with the wrist pin. Rigidly secured to the crank arm 94 on the inner side of the pitman 92 is a toothed wheel 99 which engages a pin 100 rigidly secured to the pitman 92. It will be apparent that this pin is held in engagement with the toothed wheel 99 by means of the spring 98, and that as the crank arm 94 revolves the teeth of the wheel 99 will ride over the pin, thus imparting longitudinal reciprocatory movement to the pitman, which in turn will transmit this movement to the coin separator, thus causing a constant vibratory movement to be imparted to the latter during its oscillatory movement. It will be noted that the slot 96 in the pitman 92 is of a length much greater than necessary to accommodate the vibratory movement of the pitman. This additional length is imparted to the slot to prevent injury to the separating mechanism in case coins should accumulate therein, or should in some way become wedged between the upper edge of the coin separator and the fixed member of the coin and ticket separator. Should such a wedging occur the slotted pitman will permit the upward movement of the coin separator to be checked without interrupting the further movement of the crank arm and operating handle, thus permitting the operation to continue and the coins to adjust themselves upon the next downward movement of the separator.

Means are also provided for releasing from the canceling rolls any coin or foreign substance which may, through some abnormal condition, have entered the same and which, of course, cannot pass through the same. To this end the driving gear 63 for the upper canceling roll is loosely mounted on the shaft 64 of that roll, and is provided with a clutch member 101 which coöperates with a second clutch member 102 rigidly secured to the outer end of the shaft 63. A spring 103 holds the clutch members normally in interlocking engagement, but by applying a suitable implement, such as the resetting wrench, to the end of the shaft the gear can be moved inwardly to separate the clutch members and permit the shaft and the canceling roll to be moved freely in either direction, thus permitting the roller to be moved rearwardly to discharge therefrom any substance which may have become lodged between the rollers. Arranged just in front of the canceling rollers and carried by the fixed member of the coin and ticket separator is a plate 104 extending parallel with the rollers and so arranged with relation to the fixed member of the coin and ticket separator as to form a chute through which any coin, or other substance, falling from the canceling rollers will pass and will be delivered to the coin separator. As shown in Fig. 6 the coin separator is in its uppermost position and the rear wall of the plate 84 lies in a position to intercept any coin or other article moving down the plate 104, but upon the downward movement of the coin separator this wall will be carried away from the plate 104 and the coin, or other article, will be discharged onto the separator. The plate 104 is preferably provided with a series of openings 105 to permit the passage therethrough of any torn bits of tickets, or the like, which may drop from the canceling rollers into the machine, and prevent the same from being delivered to the coin separator and thence to the ticket registering devices, where they might cause trouble. A curved guard plate 106 is supported just in the rear of the coin separator and is arranged to prevent the bits of tickets and the like which may pass through the openings 105 of the plate 104, and also the tickets themselves after they have passed through the canceling rollers, from engaging and entering the coin separator. This guard plate is, in the present instance, shown as carried by a bracket 107 which is secured to a movable door, or closure, 108, which is provided in the rear wall of the main casing to permit access to be had to the interior of the mechanism should this be desired for any purpose, as for example, to remove 25-cent pieces which may have passed through the coin and ticket separating devices, but which cannot enter the spaces between the ribs 89 of the upper separating plate 84, and consequently will remain on the separator plate until they are removed therefrom. This door is provided with a lock 109 so that it can only be opened by properly authorized persons.

The stacker to which the coins are delivered by the coin separator may be of any suitable character which will properly position the coins for registration. In the construction here shown this stacker comprises a single structure, or casting, having formed therein two tubes 110 and 111 arranged side by side and adapted to accommodate nickels and dimes, respectively. These tubes are provided with upwardly extending receiving mouths, or hoppers, 112 and 113, which are adapted to receive the coins from the respective coin separator plates and are preferably extended for the full width of the stacker structure, and consequently for the full width of the separator plates. The upper portion of the structure is widened to permit the mouths, or hoppers, to be arranged one in front of the other, thereby enabling them both to be of the full width of the structure. These tubes have their lower ends arranged adjacent to, but spaced from, a supporting plate 114 which is provided, between the tubes, with a discharge opening 115, this discharge opening being of a size sufficient to permit the passage of either nickels or dimes. The discharge opening 115 is arranged above a similar opening 116 formed in the bottom plate 3 of the main casing, and this opening 116 delivers the coins to the money box, which is here shown as a drawer 118 mounted in the ticket box 67 beneath an opening 117 which registers with the openings 115 and 116. Suitable means are provided for discharging the coins from the stacker tubes to the opening 115 and for causing the movement of the coins from the stacker tubes to control the coin registering devices. In the present construction a single ejector is provided for removing the coins from both stacker tubes and this ejector is shown as comprising a lever 119 pivotally mounted at a point some distance in the rear of the stacker tubes, as shown at 120, and having at its forward ends two arms 121 and 122, these arms being of a suitable width and of a thickness which will permit them to pass beneath the stacker tubes 110 and 111, respectively. The inner edge of each arm is curved to conform substantially to the curvature of the corresponding stacker tube, and the relative positions of the arms are such that when the ejector is at the limit of its movement in one direction the arm 122 will lie beneath the outer edge of the stacker tube 111 so as to permit the dimes to drop from this tube onto the plate 114, and the arm 121 will lie beneath the stacker tube 110 so that any coin entering this tube will drop upon and be supported by the arm. Upon the movement of the ejector in the opposite direction the dime which lies in front of the arm 122 is carried toward the discharge opening 115, and the arm 121 is moved from beneath the nickel in the stacker tube 110 to permit the latter to drop onto the plate 114 in a flat position. It will be noted that the thicknesses of the respective arms 121 and 122 are but slightly less than the distances between the respective tubes and the plate 114 so that a coin cannot ride from beneath the tube on the ejector arm. When the ejector reaches the opposite limit of its movement the situation will be reversed, that is the arm 121 will be in a position to engage the nickel, if one is dropped onto the plate 114, and the arm 122 will lie beneath the stacker tube 111. Oscillatory movement may be imparted to the ejector from the operating handle 48 in any suitable manner. As here shown the lever 119, constituting the ejector, is provided with a pin 123 which extends into a peripheral groove 124 in a cam 125 which is rigidly secured to a shaft 126 journaled in the side members 22 and 23 of the main frame. This shaft is provided on that end adjacent to the frame member 22 with a gear 127, which meshes with a pinion 128 mounted on a stud shaft 129 carried by the frame member 22, and having rigidly secured thereto a gear 130 which meshes with a gear 131 rigidly secured to the pinion 50 on the stud shaft 49 which carries the handle 48. The shape of the cam 125 and the ratio of the gearing is such as to cause a complete movement of the ejector in one direction upon each complete rotation of the operating handle. In this connection it may be noted that means are provided for preventing the movement of the operating handle, and consequently of the ejector and other parts of the mechanism in a reverse direction. As here shown this means comprises a ratchet wheel 132 mounted on the stud shaft 129 and rigidly secured to the gear 130 which meshes with the gear 131 on the shaft which carries the handle. Coöperating with this ratchet wheel is a spring actuated pawl 133. It is desirable that the mechanism should be such that a limited amount of reverse movement may be imparted thereto to enable the parts to be agitated to release a coin or other object which may have become lodged therein. To permit of this the teeth on the ratchet wheel 132 are spaced considerable distances apart so as to allow lost motion between the teeth and the pawl, and this motion is further increased by providing the pawl 133 with an elongated slot 133ª so that it may have a limited amount of longitudinal movement. In this manner a limited amount of reverse movement may be imparted to the several parts of the mechanism without permitting these parts to be moved far enough to in any wise interfere with, or complicate, the operation of the machine. As has been stated the coin register is controlled by the movement of the coins from the stacker tubes to the discharge opening 115. To this end a counter controlling arm, or setting device, 134, is pivotally mounted in front of the opening 115, and has its rear end extending across the opening 115 so as to be arranged in the path of and to be engaged by any coin which may be moved toward that opening from either side thereof. The arm 134 is rigidly secured at its rear end to a sleeve 135 which is rotatably mounted on a stud, or shaft, 136, carried by the supporting plate 114. Rigidly secured to the upper end of the sleeve 135 is a second arm 137 which extends inwardly and has pivotally mounted on its inner end a yoke 138 which engages a grooved collar 139 slidably mounted upon an actuating shaft 140 for the coin coin register. Connected with the collar 139, for sliding movement on the shaft 140, are two actuating gears 141 and 142, the first being provided with a single tooth, and the latter with two teeth. These actuating gears are adapted to coöperate with, and are normally arranged on, opposite sides of a counter gear 143 which is rotatably mounted on a counter shaft 144 and is rigidly secured to the units counter wheel of the cash counter, which is shown at 145. This units counter wheel registers in units of five, hence when the actuator 141 is in operative relation thereto it will be caused to advance one unit and to register 5¢, and when the actuator 142 is in operative relation thereto it will be caused to advance two units and to register 10¢. The controlling arm 134 is held normally in its home, or intermediate position, and in this position it retains the actuating gears 141 and 142 in their normal positions on opposite sides of the counter gear 143 so that the movement of the actuators will not affect the counter. The actuating arm may be held in this position in any suitable manner, but in the present construction it is provided with latterly extending projections, or fingers, 146 and 147, which are provided with pins 148 adapted to be engaged by a bar 149 extending transversely of the actuating arm, pivotally connected at one end to the plate 114, and connected between its ends, at a point between the pins 148, with a spring 150 which tends to move the same toward the opening 115. When the actuating arm is in its intermediate, or home position, both pins 148 will engage the bar 149, but the movement of the arm in either direction will cause one pin to exert pressure on the arm and move the same against the tension of the spring, and consequently the spring and the bar have a constant tendency to return the actuating arm to its normal position. It will be apparent, therefore, that the movement of a coin from either side of the discharge opening 115 will cause that coin to engage the end of the arm 134 and move the same about its axis, thus shifting the actuators 141 and 142 to cause that actuator corresponding with the particular coin which has engaged the actuating arm to be moved into operative relation with the counter gear. This operation takes place during the first portion of the movement of the operating handle and the further movement of this handle causes rotatory movement to be imparted to the actuator shaft 140, which movement is transmitted through that actuator which is in operative relation with the counter gear to the units counter wheel and causes the proper registration to be effected. To this end the actuator shaft 140 has mounted on the end thereof a gear 151, which is connected through an idle gear 152 with the gear 130, which, as has been explained, is operatively connected with the operating handle. It will be noted that this gear is such as to impart a complete rotation to the actuators upon each complete rotation of the handle, but the actuating teeth are so arranged upon the actuator that they will not engage the counter gear until the latter part of the movement of the operating handle, thus allowing ample time for the shifting or setting of the actuators before they are brought into operative engagement with the counter gear. It will further be noted that the counter gear is provided with wide teeth having their peripheral edges recessed, or curved, to engage the curved surface of the actuator, thus effectually locking the counter gear against rotation until it is positively engaged by an actuator tooth. In order that the coins may be free to discharge through the opening 115 and to avoid the necessity of retaining the coins in engagement with the actuating arm 134 until the setting movement of this arm has been completed, we have provided means whereby the coin serves merely to establish an operative connection between the ejector and the actuating arm, and may then be discharged through the opening and the ejector will continue the movement of the arm. To this end the adjacent ends of the fingers 146 and 147 of the actuator arm are so arranged with relation to the ends of the ejector arms 122 and 121, respectively, that a coin which is moved into engagement with the arm 134 by, say, the ejector arm 122, will so actuate the arm 134 as to move the finger 146 into the path of the ejector arm so that it will be engaged and actuated by that arm, thus releasing the coin and causing the setting movement of the actuating arm to be completed by the ejector.

The machine is provided with a trip passenger register and a total passenger register, upon each of which every fare is registered. The trip passenger register is reset to zero at the end of each trip, but the total passenger register is never reset and affords constant check upon the conductor's reports. In the present drawings the total passenger register is shown at 153 and comprises a plurality of counter wheels which are journaled upon a shaft 154. The units counter wheel is provided with a gear 155 adapted to be engaged by a one-toothed actuator 156 mounted on a shaft 157 and so connected with the operating handle as to make one complete revolution and thus advance the units counter wheel one point upon each complete rotation of the handle 48. As here shown the shaft 157 projects beyond the frame member 22 and has secured thereto a pinion 158 which meshes with a gear 159 mounted on a shaft 160 and meshing with a pinion 161 mounted on a shaft 162, and having rigidly secured thereto a gear 163 which meshes with the gear 131 on the shaft 49 which carries the operating handle. The count is transferred from the units counter wheel to the successive counter wheels in the usual, or any suitable, manner, and it is not necessary that this transfer mechanism be here shown or described. No means are provided for resetting this total passenger counter. hence it will constitute a permanent record of registrations.

The trip passenger register is shown at 164 and comprises a plurality of counter wheels mounted upon the shaft 144, these counter wheels being preferably of a size large enough to permit the registration to be read from a point some distance remote from the machine. The units counter wheel registers in units of one and is provided with a gear 165 which meshes with an actuating pinion 166 which is secured to the shaft 160 (Fig. 16). This actuator 166 is provided with a complete set of teeth and is constantly in mesh with the gear 165 of the units counter wheel, but the rotation of the gear 159, which drives the shaft 160 and the pinion 166, is such that the pinion 166 will be rotated upon each complete operation of the operating handle a distance sufficient to advance the units counter wheel one point, this movement requiring, in the present machine, that three teeth of the pinion 166 shall engage and actuate the counter gear. The trip register is intended to be reset to zero at the end of each trip, or at the end of some other predetermined period, so as to provide separate records of the number of fares received upon each trip, and we have, therefore, provided means for resetting the several counter wheels to zero. The counter wheels are loosely mounted upon the shaft 154 and are rotated thereon by the actuating pinion 166 and the transfer mechanism, which need not be here described. To reset the counters to zero suitable connections are provided between the several counter wheels and the counter shaft 154, whereby the rotation of this shaft will cause the same to pick up those counter wheels which have been moved out of their zero position and return the same to the zero position. This particular connection, or pick-up mechanism, may be of any suitable character and as that employed is not a part of the invention it need not be described, or shown in detail. Suffice it to say, that the rotation of the shaft 154 will cause the counter wheels to be returned to their zero position, provided they have first been disconnected from the actuator and transfer gears. The first step of the resetting operation must, therefore, be the disconnecting of the counters from the actuator and transfer mechanism. As has been explained the actuator 166 is mounted on the shaft 160 and this shaft also carries the transfer mechanism for the counters. The shaft 160 is so mounted that it can be moved toward and from the counters to carry the several gears thereon into and out of mesh with the corresponding counter gears, and as here shown the shaft is mounted in the ends of a pair of arms 167 rigidly secured, near the respective frame members 22 and 23, to a shaft 168 which is journaled in those frame members. Consequently rocking movement imparted to the shaft 168 will carry the actuator 166 and the transfer gears out of and into mesh with the respective counter gears. A suitable actuating device, operable from the exterior of the casing 1, is provided for actuating the shaft 154 to reset the counters to zero. As here shown this device comprises a resetting wrench 274 adapted to engage the end of a sleeve 170, journaled on a fixed stud shaft 270, and to be held against rotation relatively to that sleeve, thus causing the sleeve to rotate therewith. Rigidly secured to the sleeve 170 is a gear 171 which meshes with a gear 172 on the resetting shaft 154. The gears 171 and 172 are provided with smooth, or untoothed, portions arranged to be in engagement one with the other when the resetting mechanism is in its normal, or home, position, and of such a character as to permit of a slight movement of the sleeve 170 before any movement is imparted to the gear 172 and its shaft 154, and further, the arrangement of the teeth on the gears is such as to cause the rotation of the shaft 154 to be completed before the sleeve 170 and the gear 171 complete their movements. These intervals at the beginning and end of the resetting operation permit the shaft 160 and the gears carried thereby to be moved out of engagement with the counter gears before any movement is imparted to the counter shaft and to be returned to their operative positions, with relation to said counter gears, after the counter shaft has completed its movement. Means are provided whereby the movement of the shaft 160 is controlled by the resetting wrench and, in the present instance, the shaft 168, which carries the arms supporting the shaft 160, is provided with an arm 173 which is acted upon by a spring 174 in a direction to move the shaft 160 away from the counter shaft. This tendency of the spring actuated arm 173 is counteracted by a second arm 175, which is also rigidly secured to the shaft 168, and in the present instance is formed integral with the arm 173, and which is adapted to engage a cam rigidly secured to the sleeve 170 which carries the gear 171. This cam has a projection 176 arranged to engage the end of the arm 175 as the resetting wrench completes its movement, and to remain in engagement with said arm while the resetting mechanism is in its home position. This projection on the cam is such as to move the shaft 168 against the action of the spring 174 and bring the actuator and transfer gears into engagement with the counter gears and to retain them in that position. When the trip counter is to be reset the wrench is applied to the end of the sleeve 170 and the first movement thereof moves the projection 176 out of the path of the arm 175, thus permitting the shaft 168 to be actuated by the spring 174 and the actuator and transfer gears to be moved out of engagement with the counter gears. The shaft 168 remains in this position until the sleeve 170 approaches the end of its rotation when the cam projection 176 again engages the arm 175 and moves the shaft 168 against the tension of the spring 174 to its normal position. A ratchet wheel 177 is rigidly secured to the sleeve 170 and is engaged by a spring actuated pawl 178, which serves to lock this shaft and its coöperating devices against movement in a reverse direction. To prevent the removal of the wrench before the sleeve has made a complete revolution the stud 270 is provided near its outer end with a circumferential groove 271, and has formed therein a notch 272 so arranged as to permit a pin 273, rigidly secured in the socket of the wrench 274, to pass into the groove when the wrench is applied to the stud, thus permitting the wrench to be moved into and out of interlocking engagement with the sleeve, when the latter is in its home position. If the sleeve is not in its home position the wrench cannot move onto the stud far enough to permit the pin to enter the groove 271, and consequently the wrench cannot be rotated. After the pin has entered the groove the rotation of the wrench will cause the pin to move out of alinement with the notch 272, thus preventing the removal of the wrench until it has been returned to its home position.

Means are also provided for checking the movement of the resetting wrench at the end of a complete rotation, and for preventing the overthrow of the counters. To accomplish the first of these functions the sleeve 170 is provided with a disk on which are arranged two projections 179 and 180. Coöperating with these projections are two pawls 181 and 182, which pawls are acted upon by springs 183 and 184 which tend to move them in the same direction and to thus move one pawl into a position to be engaged by a projection on the disk and to move the other pawl into a position to clear both projections. As the sleeve 170 approaches the end of its rotation the projection 179 will engage the pawl 182 and move the same against the tension of its spring. This pawl has at its outer end a part 185 arranged to engage a corresponding part 186 on the pawl 181, and to thus move this latter pawl against the tension of its spring into the path of the projection 180, and to hold the same in that position until the wrench, and sleeve 170, have completed their movements and the projection 180 has engaged the end of the pawl 181 and its movement has been checked. The pawl 181 has sufficient movement after it has been engaged by the projection 180 to permit the projection 179 to be carried beyond its pawl 182, thus releasing the latter and permitting it to return to its normal position, and moving the part 185 away from the part 186 of the pawl 181. Consequently, as soon as the pressure on the wrench is released and the projection 180 releases the pawl, the latter will be acted upon by its spring and moved into its inoperative position, which position will permit of a further movement of the sleeve 170. Thus the device is always ready for resetting operation, but is positively stopped at the end of each complete operation.

To prevent the overflow of the trip counters at the end of the resetting operation each is provided with a disk 187 having therein a notch 188 adapted to coöperate with a pawl 190, which pawl is pivotally mounted upon a transverse member 191, of the main frame in front of the trip counters. The pawls, there being one for each counter wheel, are mounted for both a pivotal movement and a limited longitudinal movement, and are held normally in their retracted positions and in engagement with the peripheries of the disks by springs 192. As the counter wheels approach the end of their resetting movement the pawls will enter the notches 188, and thus engage the disks 187 and check the movement of the counter wheels. The movement of the counter wheels is not entirely stopped, but the momentum is overcome. The continued movement of the resetting wrench, which is necessary to move the wheels to their completely reset positions, is permitted by the longitudinal movement of the pawls, and at the end of this longitudinal movement of the pawls they are withdrawn from the notches so as to release the counter wheels for the next resetting operation. Each pawl is preferably withdrawn by means of an arm 193 rigidly secured to the shaft 168 and having a pin 194 arranged to engage a finger 195 carried by the pawl, and so arranged that when the shaft 168 is returned to its normal position at the end of the resetting operation the arm 193 will act upon the pawl to withdraw the same from the notch 188. As soon as the pawl has been withdrawn from the notch the action of its spring will tend to retract it and thus draw its nose beyond the notch so that it will not again enter the same until the counter wheel nears the end of another revolution. Consequently when the shaft 168 is shifted at the beginning of the next operation the pawl does not enter the notch but engages the periphery of the disk beyond this notch and rides on this periphery until the notch is again brought into alinement therewith.

It is also desirable that the actuating mechanism for the counter should be locked against movement during the resetting operation, and to this end we have mounted upon the frame member 22 a locking bar 196 which is connected at its lower end with the shaft 160 and is provided at its upper edge with a lip, or projection, 197, adapted to enter the space between two of the teeth on the gear 158 on the shaft 157, thus locking this gear against movement, and likewise locking against movement all the other gears which are in train therewith.

It is desirable that the resetting mechanism should be operable only when the actuating handle is in its home position, as otherwise the counter might not have completed its movement and the count might be garbled. Further, it is important that the operating handle should be locked against movement while the actuator and transfer gears are being moved into and out of mesh with the counter gears, as any movement of the actuator at this time would probably result in an inaccurate shifting of the gears, which would garble the count. We have, in the present construction, provided a single locking device which will accomplish both of these functions. This device comprises a disk 199 which is secured to the end of the shaft 162, (Fig. 4) which carries the gear 163, which in turn is in mesh with the gear on the shaft 49 of the operating handle (Fig. 3). Consequently the disk will be rotated upon each operation of the handle and the ratio of the gear is such that it will make one complete rotation for each complete rotation of the handle. This disk is provided in one edge of its periphery with a notch 200 which, when the operating handle is in its home position, is so arranged that it will receive a projection 201 on a pivoted arm 202, which is mounted on the frame member 23 and is acted upon by a spring 203 to hold the projection 201 normally in engagement with the disk. The arm 202 is provided on that side opposite the projection 201 with a second projection 204 (Fig. 19). Rigidly secured to the sleeve 170 is a disk having two projections arranged to form a space between them, which, when the resetting mechanism is in its normal or home position, will be arranged to receive the projection 204 on the arm 202. In the present instance we have utilized the projection 179 on the disk carried by the sleeve as one of the projections of this locking mechanism and have provided a second projection 206 properly spaced therefrom. Obviously, however, a separate disk with independent projections can be provided if desired. When the operating handle 48 is in its home position the projection 201 will lie in the notch 200 of the disk 199 and the projection 204 will be withdrawn from between the lugs 179 and 206 so that the sleeve 170 is free to rotate and the resetting mechanism can be operated. If the actuating handle is moved out of its home position the projection 201 will have been forced out of the notch 200 and will ride upon the periphery of the disk 199, thus moving the projection 204 of the arm 202 between the lugs 179 and 206 and locking the sleeve 170 against movement. When the sleeve 170 has been actuated to start the resetting movement the projection 179 will be moved into alinement with the projection 204 on the arm 202, thus locking the projection 201 in the recess 200 of the disk 199 and thereby locking the operating handle against rotation. The further movement of the resetting sleeve 170 will move the lug 179 beyond the lug 204 on the arm 202 and thus release the disk 199 and the operating handle to permit the latter to be operated. It will be noted that by the time sufficient movement has been imparted to the sleeve 170 to release the operating handle the actuator and transfer gears for the trip counter wheels will have been moved into their inoperative positions, and further that the movement of the shaft 160 will have carried the gear 159 out of mesh with the pinion 161 on the shaft 162, thus disconnecting this gear and consequently the passenger counter from the driving mechanism. With the parts thus disconnected the operating handle may be actuated to cause any fares which may have remained in the machine after the last registering operation to be discharged from the machine into the ticket box, or cash drawer. Inasmuch as these fares have already been registered on the trip passenger and total passenger counters it is not desirable that the operation of the handle should, and it will not, affect these counters, but the cash counters are not disconnected from the operating handle and any coins which pass through the machine will be registered upon these counters. As the sleeve 170 approaches the end of its movement the lug 206 will be moved into the path of the projection 204 on the arm 202 and the disk 199 and the operating handle again locked against movement until the sleeve 170 has reached its home position, and the actuator and transfer gears are fully in mesh with the counter gears.

Inasmuch as the transfers must be carefully examined by the conductor it is not desirable that they should be deposited in the fare box by the passenger, and the present machine is not intended to receive transfers. However, provision has been made for registering the transfers separately as well as registering them upon the passenger and trip counters. To this end I have mounted in the main frame of the machine and above the trip register, a group of transfer counters 207, the units counter having connected therewith a gear 208. Slidably mounted upon a shaft 209 is an actuator 210 which, in the present instance, is in the form of a one-toothed gear which is so arranged normally that the operation thereof will not affect the counter gear 208. Means are provided under the control of the conductor for shifting this actuator into operative relation with the counter gear and as here shown the actuator has connected therewith a shaft 211, (Fig. 5) which projects beyond the frame member 22 and has at its outer end a knob, or thumb-piece, 212, by means of which it may be pushed inward against the tension of a spring 213, which normally holds it in its outermost position. A suitable detent is provided to retain the actuator in operative relation to the counter gear during the registering operation, and as here shown this detent is in the form of a latch bar 214, pivotally mounted on the frame member 22 and having its nose resting normally on the beveled edge 215 of a collar which is rigidly secured to and forms a part of the actuator and which is provided beyond the beveled edge 215 with a shoulder 216. When the actuator is pushed in against the tension of the spring 213 the nose of the latch bar will ride over the beveled edge of the collar and will be moved into engagement with the shoulder by means of a spring 217. This shoulder is an annular one and permits the rotation of the actuator relatively to the latch bar. In the present instance the construction is such that the actuator will be automatically disconnected from the latch bar and returned to its inoperative position at the end of each operation, and to accomplish this the shoulder 216 is cut away as shown at 218, the cutaway portion being so arranged that it will not reach the latch bar until after the actuator has acted upon the counter gear, and that it will be moved past the latch bar after the actuator is moved to its inoperative position, thus bringing the shoulder into alinement with the latch bar so that the actuator can again be locked in its operative position when it is desired to register another transfer. It not infrequently happens that in collecting transfers at a busy street intersection the conductor will wish to retain a number of transfers in his hand until the car has been loaded and is ready to proceed, after which he will examine the transfers and register them. To permit this to be done without the necessity of moving the actuator to its operative position upon each registration the enlarged portion, or collar, of the actuator is provided with a second annular shoulder which is shown at 219, and is arranged beyond the first shoulder. This second shoulder has no cutaway portion and hence when the actuator has been pushed into the limit of its movement so that the latch bar engages this second shoulder, the actuator will be held in its operative position until the latch bar has been actuated to release the same. The latch bar is provided with an end portion which extends beyond the casing 1 to enable it to be actuated by the conductor. It will be noted that the end of the latch bar is so shaped that as the actuator is pushed inward to move the first shoulder 216 past the end of the latch bar, the second shoulder 219 will engage the latch bar and act as a stop to prevent the further movement of the actuator. When it is desired to move the actuator to its second position the latch bar is actuated to move the end of the same out of the path of the second shoulder, thus permitting the shoulder to pass the latch bar. It will be noted that the actuator tooth is of such length that it will be in operative engagement with the counter gear when the latch bar is in engagement with either the first or second shoulder. The actuator may be connected with the operating handle in any suitable manner. As here shown the knob, or head, 212, at the outer end of the shaft 211 is provided with a toothed portion, or gear, 220 which meshes with a pinion 221 on the shaft 157, which shaft, as has been heretofore explained, is positively driven from the actuating handle. The gear teeth are of such length that they will remain in mesh with the gear 221 during the sliding movements of the shaft. It will be noted that inasmuch as the shaft 157 is locked against rotation during the resetting operation, that the transfer counter will also be locked against operation during that time.

The mechanism is preferably provided with a bell which is sounded upon each registration of a fare, and as here shown a bell 222 is rigidly secured to the frame member 23, and a hammer, or bell tapper, 223 is pivotally mounted on a stud 224 carried by the frame member. An arm 225 rigidly secured to the bell tapper is acted upon by a spring 226 to move the tapper toward the bell. A cam 227 is rigidly secured to the shaft 126, which is connected with the operating handle in a manner heretofore explained and is provided with cam portions adapted to engage a second arm 228 rigidly secured to the bell tapper to move the same away from the bell against the tension of the spring 226 and then release the same to permit it to be moved into engagement with the bell by the spring. Inasmuch as the shaft 126 makes but a half revolution for each complete revolution of the handle the cam is provided with two operating surfaces. Means are also provided for rendering the bell inoperative during the clearing operation, that is, when the separating devices are being operated independently of the trip and total passenger registers, to clear the machine of fares remaining therein. To accomplish this the tapper is provided with a nose 229 and a pawl 230 is pivotally mounted on the shaft 168, and is acted upon by a spring 231, which tends to move the same toward the nose on the bell tapper. A shoulder 232 on the arm 173, which is secured to the shaft 168, is held normally in engagement with the pawl to hold the same out of the path of the nose on the tapper, but when the resetting movement has been started and the shaft 168 has been rocked to disconnect the trip counter wheels from their actuating and their transfer devices, the pawl will be permitted to move downward into the path of the nose on the tapper and thus prevent the tapper from striking the bell when the machine is operated.

Means are preferably provided for checking the movement of the operating handle at the end of each complete operation and for retaining the same in this position. To this end the handle is provided with a hand piece having a spring actuated plunger, or pin, 233, which is adapted to enter an opening in a lug, or stop, 234, carried by the side wall of the casing 1. An outward pull on the hand piece will move the same outward against the tension of its spring and disconnect the handle from the stop. During the rotation of the handle the hand piece is permitted to move inwardly so that the lug, or stop 234 will again lie in the path thereof. The stop is provided with a beveled surface so that the end of the pin will ride up the same and enter the recess in the stop, thus automatically locking the handle in its home position.

The operation of the mechanism as a whole will be readily understood from the description of the several parts thereof, and it will be apparent that we have provided a registering fare box of a very simple construction which will receive both coins and paper tickets and separate the coins from the tickets. Further, that the device will register each fare received and will automatically register the value of the coins. Further, the device will register transfers, thus providing for a complete record of the fares received, and making it possible to check very accurately the day's business.

While we have shown and described one embodiment of our invention we wish it to be understood that we do not desire to be limited to the details of construction as various modifications will occur to a person skilled in the art.

Having now fully described our invention, what we claim as new and desire to secure by Letters Patent, is:—

1. In a registering fare box, the combination with a passenger counter and means for operating the same, of a fare separating device comprising a member having an aperture to permit the passage of coins therethrough, and a rotatable member arranged above the first mentioned member and having fare receiving parts arranged to be moved successively into horizontal and vertical positions by the rotation of said member, means for delivering fares to one of said parts when the latter is in a substantially horizontal position, and means for actuating said rotatable member upon each operation of said passenger counter operating mechanism, whereby the fares on said rotatable member will be delivered to the first mentioned member.

2. In a registering fare box, the combination with a passenger counter and means for operating the same, of a fare separating device comprising a fixed member having apertures to permit the passage of coins therethrough, and a rotatable member comprising a plurality of webs projecting from the center thereof, means for delivering coins to one of said webs when the latter is in a substantially horizontal position, and means for actuating said rotatable member upon each operation of said passenger counter operating mechanism.

3. In a registering fare box, the combination with a passenger register and an operating handle therefor, of a fare separating device comprising a fixed member adapted to receive coins and tickets and having apertures to permit the passage of coins therethrough, and a rotatable member having four radially extending webs, each web having fingers to travel along said fixed member, means for delivering fares to one of said webs when it is in a substantially horizontal position, and an operative connection between said rotatable member and said operating handle to cause one-quarter of a revolution to be imparted to said rotatable member upon each complete operation of said handle.

4. In a mechanism of the character described, a part having a supporting surface provided with a discharge opening for coins, means for positioning coins on said surface on opposite sides of said discharge opening, an ejector to move coins from said positions toward said discharge opening, a coin register, means to cause coins of different values to be registered on said coin register, said means comprising an arm arranged to be engaged and actuated by a coin moved from a position on either side of said discharge opening toward the same, laterally extending fingers carried by said arm and so arranged with relation to said ejector that when a coin is moved by said ejector into engagement with one side of said arm, the corresponding finger will be moved into the path of said ejector and will be engaged and actuated thereby, thus releasing the coin and causing the operation of the arms to be completed by the ejector.

5. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, mechanism to reset said passenger register to zero, and means controlled by said resetting mechanism to disconnect said passenger register from said operating device to permit said separator and said coin register to be operated by said operating device independently of said passenger register to clear the machine of coins and tickets remaining therein after the last passenger has been registered.

6. In a mechanism of the character described, a coin and ticket separator, a coin controlled register to register the value of coins, an operating device to actuate said separator and said coin register, a total passenger register and a trip passenger register, operative connections between said passenger registers and said operating device to cause said passenger registers to be operated upon each operation of said operating device, mechanism to reset said trip passenger register to zero, and means controlled by said resetting mechanism to disconnect both passenger registers from said operating device to permit said separators and said coin register to be operated by said operating device independently of said passenger registers to clear the machine of coins and tickets remaining therein after the last passenger has been registered.

7. In a mechanism of the character described, a coin and ticket separator, a coin controlled register to register the value of coins, an operating device to actuate said separator and said coin register, a total passenger register and a trip passenger register, operative connections between said passenger registers and said operating device to cause both passenger registers to be operated upon each operation of said operating device, a shaft arranged adjacent to said passenger registers, driving gears for the respective passenger counters carried by said shaft, means for imparting transverse movement to said shaft to move said gears into and out of their operative positions, mechanism for resetting said trip register to zero, and means actuated by said resetting mechanism to impart movement to said shaft.

8. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, a shaft arranged adjacent to said passenger register, a driving gear for said passenger register carried by said shaft, means for imparting transverse movement to said shaft to move said gear into and out of its operative position, mechanism for resetting said passenger register to zero, and means controlled by said resetting mechanism for locking the actuator for said passenger register against movement while said resetting mechanism is being operated.

9. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, a shaft arranged adjacent to said passenger register, a driving gear for the said passenger register carried by said shaft, means for imparting transverse movement to said shaft to move said gear into and out of its operative position, mechanism for resetting said passenger register to zero, and a lock bar connected with said movable shaft and adapted to engage a part of the operating mechanism for said passenger register to render the same inoperative during the resetting of said passenger register.

10. In a mechanism of the character described, a coin and ticket separator, a coin controlled register to register the value of coins, an operating device to actuate said separator and said coin register, a passenger register, operative connections between said passenger register and said operating device to cause said passenger register to be operated upon each operation of said operating device, a shaft arranged adjacent to said passenger register, a driving gear for said passenger register carried by said shaft, means for imparting transverse movement to said shaft to move said gear into and out of its operative position, mechanism for resetting said passenger register to zero, means actuated by said resetting mechanism to impart movement to said shaft, and a locking device controlled by said resetting mechanism to prevent the movement of said operating device after the initial movement of said resetting mechanism until said gear has been moved into its inoperative position.

11. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, a shaft arranged adjacent to said passenger register, a driving gear for said passenger register carried by said shaft, means for imparting transverse movement to said shaft to move said gear into and out of its operative position, mechanism for resetting said passenger register to zero, and a locking device to prevent the operation of said resetting mechanism except when said operating device is in a predetermined position.

12. In a mechanism of the character described, a coin and ticket separator, a coin controlled register to register the value of coins, an operating device to actuate said separator and said coin register, a passenger register, operative connections between said passenger register and said operating device to cause said passenger register to be operated upon each operation of said operating device, a shaft arranged adjacent to said passenger register, a driving gear for said passenger register carried by said shaft, means for imparting transverse movement to said shaft to move said gear into and out of its operative position, mechanism for resetting said passenger register to zero, and a locking device to prevent the operation of said resetting mechanism except when said operating device is in a predetermined position, and to prevent the movement of said operating device from said predetermined position during the first portion of the operation of said resetting mechanism.

13. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, a shaft arranged adjacent to said passenger register, a driving gear for said passenger register carried by said shaft, means for imparting transverse movement to said shaft to move said gear into and out of its operative position, mechanism for resetting said passenger register to zero, and a locking device to prevent the operation of said resetting mechanism except when said operating device is in a predetermined position, and to prevent the movement of said operating device from said predetermined position during the first and last portion of the operation of said resetting mechanism.

14. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, a rock shaft, arms rigidly secured to said rock shaft, a shaft journaled in said rock arms, a driving gear for said passenger register carried by said last-mentioned shaft and movable into and out of its operative position by the movement of said shaft, means for resetting said passenger counter to zero comprising a gear, a second gear coöperating with the first-mentioned gear, means for actuating said second gear, an arm rigidly secured to said rock shaft, and a part connected with said last-mentioned gear to engage said arm and actuate said rock shaft.

15. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, a rock shaft, arms rigidly secured to said rock shaft, a shaft journaled in said rock arms, a driving gear for said passenger register carried by said last-mentioned shaft and movable into and out of its operative position by the movement of said shaft, means for resetting said passenger counter to zero comprising a gear, a second gear coöperating with the first-mentioned gear, means for actuating said second gear, a spring acting on said rock shaft to move said driving gear into its inoperative position, an arm rigidly secured to said rock shaft, a part connected with the last-mentioned gear of said resetting means and arranged to engage said rock arm and hold said driving gear in its operative position when said resetting means is in its normal position, and to release said arm to permit said driving gear to be moved into its inoperative position when said resetting means has been moved from its normal position.

16. In a mechanism of the character described, a coin and ticket separator, a coin controlled register to register the value of coins, an operating device to actuate said separator and said coin register, a passenger register, an operative connection between said passenger register and said operating device to cause said passenger register to be operated upon each operation of said operating device, a rock shaft, arms rigidly secured to said rock shaft, a shaft journaled in said rock arms, a driving gear for said passenger register carried by said last-mentioned shaft and movable into and out of its operative position by the movement of said shaft, means for resetting said passenger counter to zero comprising a gear, a second gear coöperating with the first-mentioned gear, means for actuating said second gear, a spring acting on said rock shaft to move said driving gear into its inoperative position, an arm rigidly secured to said rock shaft, a part connected with the last-mentioned gear of said resetting means and arranged to engage said rock arm and hold said driving gear in its operative position when said resetting means is in its normal position, and to release said arm to permit said driving gear to be moved into its inoperative position when said resetting means has been moved from its normal position, and means to prevent resetting movement being imparted to said passenger register while said part is in engagement with said arm.

17. In a mechanism of the character described, a separating device for coin and ticket fares, a coin register, an operating device connected with said separating device and said coin register, a passenger register, a connection between said passenger register and said operating device to cause said passenger register to be actuated upon each operation of said operating device, means for disconnecting said passenger register from said operating device to permit said separating devices and said coin registering device to be operated independently of said passenger register, a bell, a tapper therefor, means controlled by said operating device to actuate said tapper, and means to render said tapper inoperative when said passenger register is disconnected from said operating device.

18. In a mechanism of the character described, a separating device for coin and ticket fares, a coin register, an operating device connected with said separating device and said coin register, a passenger register, a connection between said passenger register and said operating device to cause said passenger register to be actuated upon each operation of said operating device, means for disconnecting said passenger register from said operating device to permit said separating device and said coin registering device to be operated independently of said passenger register, a bell, a tapper therefor, means controlled by said operating device to actuate said tapper, a pawl mounted adjacent to said tapper and an operative connection between said pawl and the means for disconnecting said passenger register from said operating device to cause said pawl to engage said tapper when said passenger register has been disconnected from said operating device.

19. In a mechanism of the character described, a separator for coin and ticket fares, a coin controlled register to register the value of coins, an operating device connected with said separator and said coin controlled register, a passenger counter, an operative connection between said passenger counter and said operating device to cause said passenger register to be operated upon each operation of said operating device, a transfer register normally disconnected from said operating device, and means under the control of the operator to establish a connection between said operating device and said transfer register.

20. In a mechanism of the character described, a separator for coin and ticket fares, a coin controlled register to register the value of the coins, an operating device connected with said separator and said coin controlled register, a passenger counter, an operative connection between said passenger counter and said operating device to cause said passenger register to be operated upon each operation of said operating device, a transfer register normally disconnected from said operating device, means under the control of the operator to establish a connection between said operating device and said transfer register, and means to automatically disconnect said transfer register from said operating device after said register has been operated.

21. In a mechanism of the character described, a separator for coin and ticket fares, a coin controlled register to register the value of the coins, an operating device connected with said separator and said coin controlled register, a passenger counter, an operative connection between said passenger counter and said operating device to cause said passenger register to be operated upon each operation of said operating device, a transfer register, a gear connected with the units counter thereof, an actuator arranged adjacent to said gear and movable into and out of operative relation therewith, a spring to hold said actuator normally in its inoperative position, means to move said actuator into its operative position, a detent to hold said actuator in its operative position, and an operative connection between said actuator and said operating device.

22. In a mechanism of the character described, a separator for coin and ticket fares, a coin controlled register to register the value of the coins, an operative device connected with said separator and said coin controlled register, a passenger counter, an operative connection between said passenger counter and said operating device to cause said passenger register to be operated upon each operation of said operating device, a transfer register, a gear connected with the units counter thereof, an actuator arranged adjacent to said gear and movable into and out of operative relation therewith, a spring to hold said actuator normally in its inoperative position, means to move said actuator into its operative position, a detent to hold said actuator in its operative position, an operative connection between said actuator and said operating device, and means to automatically release said actuator from said detent after said transfer register has been actuated.

23. In a mechanism of the character described, a separator for coin and ticket fares, a coin controlled register to register the value of the coins, an operating device connected with said separator and said coin controlled register, a passenger counter, an operative connection between said passenger counter and said operating device to cause said passenger counter to be operated upon each operation of said operating device, a transfer register comprising a gear, an actuator slidably mounted adjacent to said gear for movement into and out of operative relation therewith, a part movable with said actuator and having a circumferential shoulder, a spring tending to hold said actuator normally in its inoperative position, means to move said actuator into its operative position, a detent adapted to engage said shoulder to retain said actuator in its operative position, a portion of said shoulder being cut away to release said part from said detent after said transfer register has been operated, and an operative connection between said actuator and said operating device.

24. In a mechanism of the character described, a separator for coin and ticket fares, a coin controlled register to register the value of the coins, an operating device connected with said separator and said coin controlled register, a passenger counter, an operative connection between said passenger counter and said operating device to cause said passenger counter to be operated upon each operation of said operating device, a transfer register comprising a gear, an actuator slidably mounted adjacent to said gear for movement into and out of operative relation therewith, a part connected with said actuator and having two circumferential shoulders, a detent mounted adjacent to said shoulder part, means for imparting movement to said actuator to move said actuator into operative relation with said gear and to bring either shoulder into operative engagement with said detent, one of said shoulders having a portion cut away to automatically release the same from said detent, and the other shoulder being continuous, said detent having means for disconnecting it from said second shoulder, and an operative connection between said actuator and said operating device.

25. In a registering fare box, in combination with a common fare receiver and common registering mechanism for coin and ticket fares, of a fare separator coöperating with said receiver and mechanism and having openings for the passage of the coins and downwardly extending walls forming channels through which the coins may pass, said channels having offset portions to prevent the passage of tickets, and means to remove the tickets from the separator.

26. In a registering fare box, in combination with a common fare receiver and common registering mechanism for coin and ticket fares, of a fare separator coöperating with said receiver and mechanism and having openings for the passage of the coins and downwardly extending walls forming channels leading from said openings, said walls being curved to prevent the passage of tickets, and means for removing the tickets from the separator.

27. In a registering fare box, in combination with a common fare receiver and common registering mechanism for coin and ticket fares, of a fare separator coöperating with said receiver and mechanism and having openings for the passage of the coins, also having walls forming a channel leading from said openings and being shaped to provide a turn which will prevent the passage of tickets therethrough, and means for removing the tickets from the separator.

28. In a registering fare box, in combination with a common fare receiver and common registering mechanism for coin and ticket fares, of a fare separator coöperating with said receiver and mechanism and having openings for the passage of coins and walls leading from said openings, one of said walls being inclined upwardly and in the direction of travel of the fares through the separator, another of the walls having offset portions providing a turn which will prevent the passing of tickets, and means for removing tickets from the separator.

29. In a registering fare box, in combination with a common fare receiver and common registering mechanism for coin and ticket fares, of a fare separator coöperating with said receiver and mechanism and comprising a member to display the fares having its fare supporting surface provided with openings for the passage of coins, and comprising walls forming channels leading from said openings and converging to a single discharge opening for the coins and acting to prevent the passage of tickets therethrough, and means for removing the tickets from the separator.

30. In a registering fare box, in combination with a common fare receiver and common registering mechanism for coin and ticket fares, of a fare separator coöperating with said receiver and mechanism and comprising a member to display the fares and having a series of transversely extending openings, walls extending downwardly between said openings and forming curved channels through which coins may pass but which act to prevent the passing of tickets, and means to remove the tickets from the separator.

31. In a registering fare box, in combination with a common fare receiver and common registering mechanism for coin and ticket fares, of a fare separator coöperating with said receiver and mechanism and comprising a member to display the fares having its supporting surface provided with a double series of transversely extending openings, downwardly and inwardly extending walls comprising a laterally extending lower portion and forming curved channels through which the coins may pass but which prevent the passing of tickets, and means for removing tickets from the separator.

32. In a registering fare box, in combination with a common fare receiver and common registering mechanism for coin and ticket fares, of a fare separator coöperating with said receiver and mechanism and comprising a member to display the fares having its supporting surface provided with transversely extending openings through which coins may pass, downwardly and inwardly extending walls comprising a laterally extending lower portion and ledges, said walls forming curved channels through which coins will pass from the separator, and said curves and ledges serving to prevent the passing of tickets, and means to remove the tickets from the separator.

33. In a registering fare box, in combination with a common fare receiver and common registering mechanism for coin and ticket fares, of a fare separator coöperating with said receiver and mechanism and comprising a member to display the fares and having its fare supporting surface provided with longitudinally extended ribs, openings formed between said ribs, depending walls forming channels leading from said openings through which coins may pass and having offset portions and turns which prevent the passing of tickets therethrough, and means for removing the tickets from the separator.

34. In a registering fare box, in combination with a common fare receiver and common registering mechanism for coin and ticket fares, of a fare separator comprising a fare display member coöperating with said receiver and mechanism, means comprising downwardly and inwardly curved walls whereby coins will be caused to move by gravity through the separator, and positive means for moving the tickets from the separator.

35. In a registering fare box, in combination with a common fare receiver and common registering mechanism for coin and ticket fares, of a fare separator comprising a housing having grooves arranged in the direction in which the fares move therethrough, and openings through which the coins may pass, a fare display member operable in said housing and having a plurality of fingers coöperating with said grooves and acting to remove the tickets from the separator.

36. In a fare box, in combination with a common fare receiver, of a fare separator comprising a rotatable fare display member coöperating with said receiver, means comprising downwardly and inwardly inclined walls forming curved channels whereby coins will be caused to be discharged by gravity from the separator, and means carried by said rotatable member for removing the tickets from the separator.

37. In a fare box, in combination with a common receiver for coin and ticket fares, of a fare separator comprising a member having a plurality of webs adapted to support the fares and to be rotated successively to position to display the fares, downwardly and inwardly curved walls forming a channel and having an aperture through which coins delivered from the display member may pass, and means carried by said member for removing the tickets from the separator.

38. In a fare box, in combination with a common receiver for coin and ticket fares, of a fare separator comprising a housing having downwardly and inwardly curved walls and an aperture through which coins may pass by gravity, a member rotatably mounted in said housing and having a plurality of radially disposed webs adapted to support the fares and to be rotated successively to position to display the fares, and means carried by the display member to remove the tickets from the separator.

39. In a fare box, in combination with a common receiver for coin and ticket fares, of a fare separator coöperating with said receiver and comprising a housing having downwardly and inwardly curved walls and an aperture through which coins may pass, a member rotatably mounted relative to said housing and having a plurality of webs adapted to be successively disposed horizontally in the fare receiver to display the fares therein, and means carried by said member for removing the tickets from said housing.

40. In a fare box, in combination with a common receiver for coin and ticket fares, of a fare separator coöperating with said receiver and comprising a housing having downwardly curved channels having openings through which coins may pass, a member rotatably mounted relative to said housing and having a plurality of webs extending radially from the center thereof and adapted to be rotated to opposite horizontal planes to display the fares successively and means carried by the display member to remove the ticket fares from said housing.

41. In a fare box, in combination with a common receiver for coin and ticket fares, of a fare separator coöperating with said receiver, having downwardly curved walls forming a channel having an opening through which coins may move by gravity from the separator, a member operable in said housing and adapted to display the fares in said receiver, ticket canceling devices supported relative to the housing, and means carried by the display member to discharge the tickets from the housing to said canceling devices.

42. In a fare box, in combination with a common receiver for coin and ticket fares, of a fare separator coöperating with said receiver and having means whereby coins will be caused to pass therethrough by gravity, ticket canceling devices supported relative to the housing, and a member operable relative to the housing and adapted to discharge the tickets therefrom to said canceling devices.

43. In a registering fare box, in combination with a common fare receiver and common registering mechanism for cash fares of different denominations, of a device to receive the fares from said receiver, and means to impart vibratory, oscillating movement to said device to separate the fares delivered thereto and present the same for registration according to their denominations.

44. In a registering fare box, in combination with a common fare receiver and common registering mechanism for cash fares of different denominations, of a device to receive the fares from said receiver, and means to impart vibratory oscillating movement to said device to separate the fares delivered thereto by gravitation and present the same to said registering mechanism according to their denominations.

45. In a registering fare box, in combination with a common fare receiver and common registering mechanism for fares of different denominations, of a device to receive the fares from the receiver, and means comprising a yieldingly connected pitman and a toothed wheel coöperating therewith to impart movement to said device to separate the fares therein by gravitation and present the same to said registering mechanism according to their denominations.

46. In a fare box, registering mechanism common to cash fares only and a trip register common to all fares, zero-setting mechanism for the trip register, and means whereby the value of fares may be registered when the trip register is in zero-setting relation.

47. In a fare box, registering mechanism common to cash fares only and a trip register common to all fares, zero-setting mechanism whereby the trip register may be rendered inoperative as to the registration of fares, and means whereby the value of cash fares may be registered when the trip register is in said inoperative relation.

48. In a fare box, registering mechanism common to cash fares only and a trip register common to all fares, zero-setting mechanism whereby the trip register may be rendered inoperative as to registration, and means actuated by the coins whereby the value of cash fares may be registered when the trip register is in said inoperative relation.

49. In a fare box, registering mechanism common to cash fares only, a trip register common to all fares, and common actuating mechanism for all registering operations, zero-setting mechanism whereby the trip register may be rendered inoperative as to registration and connections whereby the value of cash fares may be registered when the trip register is in said inoperative relation.

50. In a fare box, registering mechanism common to cash fares only, a trip register and bell mechanism common to all fares, and common actuating mechanism for all registering operations, zero-setting mechanism whereby the trip register and bell mechanism may be rendered inoperative, and connections whereby the value of cash fares may be registered when said parts are in inoperative relation.

51. In a fare box, in combination with a common fare receiver and common registering mechanism for cash fares of different denominations, of a device to receive the fares from said receiver and comprising an inclined plate having a longitudinal opening arranged therein of a width to permit passage of coins of certain denominations and prevent passage of coins of other denominations, and means to actuate said device as a whole whereby separation of said coins will be effected, and certain of the coins will be positioned relative to the registering mechanism.

52. In a fare box, in combination with a common fare receiver and common registering mechanism for cash fares of different denominations, of a device to receive the fares from said receiver and comprising an inclined plate having a plurality of parallel longitudinal openings and parallel ribs arranged along said openings on opposite sides thereof spaced one from another to permit passage of coins of certain denominations over said openings and cause coins of other denominations to pass through said openings, and means to actuate said device as a whole whereby separation of the coins will be effected and certain of the coins will be positioned relative to the registering mechanism.

53. In a fare box, in combination with a common fare receiver and common registering mechanism for cash fares of different denominations, of a device comprising a tray to receive the fares from said receiver of an inclined channel coöperating with the tray to receive the fares therefrom and having a longitudinal opening of a width to permit passage of coins of certain denominations and prevent passage of coins of other denominations, and means to actuate said device as a whole whereby separation of the coins will be effected according to denomination and certain of the coins will be positioned relative to the registering mechanism.

54. In a fare box, in combination with a common fare receiver and common registering mechanism for cash fares of different denominations, of a device comprising a tray to receive the fares from said receiver, an inclined channel coöperating with the tray to receive the fares therefrom and having an opening of a width to permit passage of coins of certain denominations and prevent passage of coins of other denominations, a guard interposed between the tray and said channel to prevent passage of coins of predetermined thickness from the tray, and means to actuate said device whereby separation of the coins will be effected and certain of the coins will be positioned relative to the registering mechanism.

55. In a fare box, in combination with a common fare receiver and common registering mechanism for cash fares of different denominations, of a device to receive the fares from said receiver and comprising an inclined plate having a longitudinal opening and parallel ribs disposed along the opposite sides of said opening and forming ledges whereby coins of certain denominations will be carried over said opening and coins of other denominations will be caused to pass therethrough, and means to actuate said device whereby separation of the coins will be effected and certain of the coins will be positioned relative to the registering mechanism.

56. In a fare box, in combination with a common fare receiver and common registering mechanism for cash fares of different denominations, of a device coöperating with said receiver to receive the fares therefrom and comprising a plurality of superimposed plates having longitudinal openings of unequal width therein and ledges arranged along said openings whereby coins of certain denominations will be carried over the opening of one of said plates and coins of other denominations will be cause to pass therethrough and to be carried over the opening of another plate, and other coins will be caused to pass through the openings of both plates, and means to actuate said device whereby separation of the coins will be effected and the first and second named coins will be positioned relative to the registering mechanism.

57. In a fare box, in combination with a common fare receiver and common registering mechanism for cash fares of different denominations, of a device to receive the fares from said receiver comprising an inclined plate having a longitudinal opening arranged therein of a width to permit coins of certain denominations to pass thereover and coins of other denominations to pass therethrough, means to actuate said device whereby separation of the coins will be effected and certain of the coins will be positioned relative to said registering mechanism.

58. In a fare box, in combination with a common fare receiver and common registering mechanism for cash fares of different denominations, of a device to receive the fares from said receiver comprising an inclined plate having a spaced channel and longitudinal opening therein of a width to cause certain of the coins to pass over said opening and through said channel and other coins to pass through the opening, means to impart vibratory, oscillating movement to said device whereby separation of the coins will be effected and certain of the coins will be positioned relative to said registering mechanism.

59. In a fare box, in combination with a common fare receiver and common registering mechanism for cash fares of different denominations, of a device to receive the fares from said receiver and having a plurality of graduated channels and longitudinal openings coöperating with said channels of a width to cause certain of the coins to pass thereover and other coins to pass therethrough, and means to actuate said device whereby separation of the coins will be effected by gravitation and certain of the coins will be positioned relative to said registering mechanism.

60. In a fare box, in combination with a common fare receiver and common registering mechanism for cash fares of different denominations, of a device to receive the fares from said receiver and having a plurality of graduated longitudinal openings therein of a width to cause certain of the coins to pass thereover and other coins to pass therethrough, means to successively oscillate said device whereby separation of the coins will be effected by gravitation and certain of the coins will be positioned relative to said registering mechanism.

In testimony whereof, we affix our signatures hereto.

DAVID B. WHISTLER.
CHAS. W. RIPSCH.